US012542215B2

(12) United States Patent
Rebel et al.

(10) Patent No.: US 12,542,215 B2
(45) Date of Patent: Feb. 3, 2026

(54) DETECTION OF EARLY-STAGE LUNG CANCER IN SPUTUM USING AUTOMATED FLOW CYTOMETRY AND MACHINE LEARNING

(71) Applicant: bioAffinity Technologies, Inc., San Antonio, TX (US)

(72) Inventors: Vivienne I. Rebel, San Antonio, TX (US); Madeleine E. Lemieux, Plantagenet (CA)

(73) Assignee: bioAffinity Technologies, Inc., San Antonio, TX (US)

( * ) Notice: Subject to any disclaimer, the term of this patent is extended or adjusted under 35 U.S.C. 154(b) by 0 days.

(21) Appl. No.: 18/745,375

(22) Filed: Jun. 17, 2024

(65) Prior Publication Data
US 2025/0069747 A1    Feb. 27, 2025

Related U.S. Application Data

(63) Continuation of application No. PCT/US2022/053353, filed on Dec. 19, 2022.
(Continued)

(51) Int. Cl.
*G01N 33/48* (2006.01)
*G01N 15/14* (2006.01)
(Continued)

(52) U.S. Cl.
CPC ......... *G16H 50/20* (2018.01); *G01N 15/1425* (2013.01); *G01N 15/1429* (2013.01); *G16B 40/20* (2019.02); *A61B 10/0051* (2013.01)

(58) Field of Classification Search
CPC ............... G16H 50/20; G01N 15/1425; G01N 15/1429; G16B 40/20; A61B 10/0051
See application file for complete search history.

(56) References Cited

U.S. PATENT DOCUMENTS

2002/0115121 A1    8/2002 Garwin
2003/0190602 A1   10/2003 Pressman et al.
(Continued)

FOREIGN PATENT DOCUMENTS

WO    2019200403         10/2019
WO    2023114538 A2       6/2023
WO    2024006142 A1       1/2024

OTHER PUBLICATIONS

Risse, E. K., et al., "Relationship between the cellular composition of sputum and the cytologic diagnosis of lung cancer", Acta Cytol., vol. 31, No. 2, 1987, 170-176.
(Continued)

*Primary Examiner* — Russell S Negin
(74) *Attorney, Agent, or Firm* — Peacock Law P.C.; Janeen Vilven

(57) ABSTRACT

A system and method for analyzing a sputum sample from a subject suspected of having lung cancer comprising obtaining a plurality of cells from the sputum sample from the subject, marking the plurality of cells with i) a plurality of cell lineage specific marker compositions, ii) a cell viability composition and iii) a tetra (4-carboxyphenyl) porphyrin (TCPP) composition; analyzing with the flow cytometer the plurality of cells marked with i-iii to obtain a subpopulation selected for cell size from the plurality of cells based upon an automatically selected bead size exclusion gate; from the cell size selected subpopulation, selecting a viable singlet population of cells using an automated non-debris gate and an automated singlets gate; from the viable singlet population of cells, obtaining flow cytometer values based upon the plurality of cell lineage specific marker compositions, the viability marker and the TCPP marker; applying a trained classifier to meta data from the subject and the flow cytometric values obtained; and generating, based upon the application of the trained classifier,
(Continued)

a classification for the sputum sample wherein the classification is selected from a plurality of classification options comprising cancer and non-cancer.

21 Claims, 11 Drawing Sheets

Related U.S. Application Data

(60) Provisional application No. 63/390,826, filed on Jul. 20, 2022, provisional application No. 63/357,994, filed on Jul. 1, 2022, provisional application No. 63/291,247, filed on Dec. 17, 2021.

(51) Int. Cl.
| | |
|---|---|
| G01N 15/1429 | (2024.01) |
| G01N 33/50 | (2006.01) |
| G16B 40/20 | (2019.01) |
| G16H 50/20 | (2018.01) |
| A61B 10/00 | (2006.01) |

(56) References Cited

U.S. PATENT DOCUMENTS

| | | |
|---|---|---|
| 2009/0136946 A1 | 5/2009 | Connelly et al. |
| 2011/0189670 A1 | 8/2011 | Katz et al. |
| 2015/0160197 A1 | 6/2015 | Dorian et al. |
| 2021/0102957 A1 | 4/2021 | Rebel |
| 2021/0210205 A1 | 7/2021 | Drake et al. |

OTHER PUBLICATIONS

Sacher, Adrian G., et al., "Application of Plasma Genotyping Technologies in Non-Small Cell Lung Cancer: A Practical Review", Journal of Thoracic Oncology, vol. 12, No. 9, 2017, 1344-1356.
Schupp, Jonathan, "Targeting myeloid cells in the tumor sustaining microenvironment", Cellular Immunology, vol. 343, 2019, 1-16.
Shiota, Yutaro, et al., "Flow cytometric analysis of lymphocytes and lymphocyte subpopulations in induced sputum from patients with asthma", Allergology International, vol. 49, 2000, 125-133.
Skirecki, Tomasz, et al., "Flow Cytometric Analysis of CD133- and EpCAM-Positive Cells in Peripheral Blood of Patients with Lung Cancer", Arch Immunol Ther Exp, vol. 62, 2014, 67-75.
Speicher, Michael R., et al., "Tumor Signatures in the Blood", Nature Biotechnology, vol. 32, No. 5, 2014, 441-443.
Stahl, David L., et al., "Complications of Bronchoscopy: A Concise Synopsis", Int J Crit Illn Inj Sci., vol. 5, No. 3, 2015, 189-195.
Tanqri, Shabnam, et al., "Validation of Cell-based Fluorescence Assays: Practice Guidelines from the ICSH and ICCS—Part III—Analytical Issues", Cytometry Part B (Clinical Cytometry) 84B, 2013, 291-308.
Thomas, Hilaire, "Sputum: Preparation and Examination of Gram Stained Smears", https://www.uvmhealth.org/medcenter/Documents/8138Sputum_Gram_Stain.ppt, 1-19.
Thunnissen, F B J M, et al., "Sputum Examination for Early Detection of Lung Cancer", J Clin Pathol, vol. 56, 2003, 805-810.
Tyrer, Harry W., et al., "Automatic Cell Identification and Enrichment in Lung Cancer: V. Adenocarcinoma and Large Cell Undifferentiated Carcinoma", Cytometry, vol. 6, 1985, 37-46.
Uei, Yoshio, et al., "Comparison of Cytologic Markers for Automated Lung Cancer Screening", Analytical and Quantitative Cytology and Histology, vol. 12, No. 5, 1990, 327-332.
Vidal, Silvia, et al., "Flow cytometry analysis of leukocytes in induced sputum from asthmatic patients", Immunobiology, vol. 217, 2012, 692-697.
Ward-Hartsonge, Kirsten A., et al., "Regulatory T-cell heterogeneity and the cancer", Clinical & Translational Immunology, vol. 6, e154, 2017, 1-5.
Wood, Douglas E., et al., "National Comprehensive Cancer Network (NCCN) Clinical Practice Guidelines for Lung Cancer Screening", Thorac Surg Clin, vol. 25, 2015, 185-197.
Wright, P., et al., "An Association Between Sputum Eosinophilia and Carcinoma of the Lung: A Study of 549 Patients", Irish Journal of Medical Science, Cahill, Dublin, IE, vol. 163, No. 11, 1994, 492-493.
Yao, Yi, et al., "Multiparameter Single Cell Profiling of Airway Inflammatory Cells", Cytometry Part B, vol. 92B, 2017, 12-20.
Yu, Yen-Rei, et al., "Flow Cytometric Analysis of Myeloid Cells in Human Blood, Bronchoalveolar Lavage, and Lung Tissues", Am J Respir Cell Mol Biol, vol. 54, Issue 1, 2016, 13-24.
Zamay, Tatiana N., et al., "Current and Prospective Protein Biomarkers of Lung Cancer", Cancers, vol. 9, No. 155, 2017, 1-22.
Zhang, Chenran, et al., "Noninvasive Imaging of CD206-Positive M2 Macro-phages as an Early Biomarker for Post-Chemotherapy Tumor Relapse and Lymph Node Metastasis", Theranostics, vol. 7, Issue 17, 2017, 4276-4288.
Alexis, Neil E., et al., "Association between airway hyperreactivity and bronchial macrophage dysfunction in individuals with mild asthma", Am J Physiol Lung Mol Physiol, vol. 280, 2001, L369-L375.
Altman, K. I., et al., "Localization of a halogenated porphyrin in mouse tumours", Nature, vol. 187, 1960, 1124.
Baharom, Faezzah, et al., "Human Lung Mononuclear Phagocytes in Health and Disease", Frontiers in Immunology, vol. 8, Article 499, 2017, 1-16.
Barnes, Tristan A., et al., "Hype or Hope: the prognostic value of infiltrating immune cells in cancer", British Journal of Cancer, vol. 117, No. 4, 2017, 451-460.
Brezicka, Thomas, et al., "Expression of epithelial-cell adhesion molecule (EP-CAM) in small cell lung cancer as defined by monoclonal antibodies 17-1A and BerEP4", Acta Oncologica, vol. 44, No. 7, 2005, 723-727.
Brooks, Collin R., et al., "Identifying Leukocyte Populations in Fresh and Cryopreserved Sputum Using Flow Cytometry", Cytometry Part B (Clinical Cytometry) 84B, 2013, 104-113.
Church, Timothy R., et al., "Results of Initial Low-Dose Computed Tomographic Screening for Lung Cancer", N Engl J Med, vol. 368, 2013, 1980-1991.
Conrad, Valerie K., et al., "Implementation and Validation of an Automated Flow Cytometry Analysis Pipeline for Human Immune Profiling", Cytometry Part A, vol. 95A, 2019, 183-191.
Desch, A. Nicole, et al., "Flow Cytometric Analysis of Mononuclear Phagocytes in Nondiseased Human Lung and Lung-Draining Lymph Nodes", American Journal of Respiratory and Critical Care Medicine vol. 193 No. 6, 2016, 614-626.
Dominguez Ortega, J., et al., "Fluorocytometric analysis of induced sputum cells in an asthmatic population", J Invest Allergol Clin Immunol, vol. 14, No. 2, 2004, 108-113.
Dorman, Sandra C., et al., "Sputum CD34 + IL-5R[alpha] + Cells Increase after Allergen: Evidence for In Situ Eosinophilopoiesis", Am J Respir Crit Care Med, vol. 169, 2004, 573-577.
Elzi, David J., et al., "Porphyrin uptake in lung cancer cells by dynamin-mediated endocytosis: a novel marker of dysregulated endocytosis in cancer", Molecular Biology of the Cell; Annual Meeting of the American-Society-for-Cell-Biology (ASCB), 2015, 1.
Erozan, Yener S., et al., "Cytopathologic diagnosis of cancer in pulmonary material: a critical histopathologic correlation", Acta Cytol., vol. 14, No. 9, 1970, 560-565.
Farber, Seymour M., "Clinical Appraisal of Pulmonary Cytology", The Journal of the American Medical Association, vol. 175, No. 5, 1961, 345-348.
Figge, Frank H. J., et al., "Cancer Detection and Therapy. Affinity of Neoplastic, Embryonic, and Traumatized Tissues for Porphyrins and Metalloporphyrins", Proc Soc Exp Biol Med Soc Exp Biol Med N Y, vol. 68, No. 3, 1948, 640-641.
Fillmore, Christine M., et al., "EZH2 inhibition sensitizes BRG1 and EGFR mutant lung tumours to TopoII inhibitors", Nature, vol. 520, 2015, 239-242.

(56) References Cited

OTHER PUBLICATIONS

Franciosi, Luigi G., et al., "Markers of disease severity in chronic obstructive pulmonary disease", Pulmonary Pharmacology & Therapeutics, vol. 19, 2006, 189-199.

Franks, Teri J., et al., "Resident Cellular Components of the Human Lung Current Knowledge and Goals for Research on Cell Phenotyping and Function", Proc Am Thorac Soc, vol. 5, 2008, 763-766.

Freeman, Christine M., et al., "Design of a Multi-Center Immunophenotyping Analysis of Peripheral Blood, Sputum and Bronchoalveolar Lavage Fluid in the Subpopulations and Intermediate Outcome Measures in COPD Study (Spiromics)", Journal of Translational Medicine, vol. 13, No. 19, 2015, 1-17.

Gao, Weimin, et al., "Detection of Point Mutations of K-ras Oncogene and p53 Tumor-Suppresor Gene in Sputum Samples", Molecular Toxicology Protocols, Methods in Molecular Biology, vol. 1105, 2014, 325-344.

Garn, Holger, "Specific aspects of flow cytometric analysis of cells from the lung", Experimental and Toxicologic Pathology, vol. 57, S2, 2006, 21-24.

Hinson, K. F. W., et al., "The diagnosis of lung cancer by examination of sputum", Thorax, vol. 18, 1963, 350-353.

Hosokawa, Masahito, et al., "Size-Based Isolation of Circulating Tumor Cells in Lung Cancer Patients Using a Microcavity Array System", PLoS ONE, vol. 8, No. 6, 2013, e67466.

Johnston, William W., et al., "Ten years of respiratory cytopathology at Duke University Medical Center. I. The cytopathologic diagnosis of lung cancer during the years 1970 to 1974, noting the significance of specimen number and type", Acta Cytol., vol. 25, No. 2, 1981, 103-107.

Kamiloglu, Senem, et al., "Guidelines for cell viability assays", Food Frontiers, vol. 1, 2020, 332-349.

Kidney, Joseph C., et al., "Elevated B Cells in Sputum of Asthmatics: Close Correlation with Eosinophils", Am J Respir Crit Care Med, vol. 153, 1996, 540-544.

Korbelik, M., et al., "Distribution of Photofrin Between Tumour Cells and Tumour Associated Macrophages", B. J. Cancer, vol. 64, 1991, 508-512.

Korbelik, Mladen, et al., "Photofrin Uptake by Murine Macrophages", Cancer Research, vol. 51, 1991, 2251-2255.

Kraemer, Petra S., et al., "Flow Cytometric Enrichment for Respiratory Epithelial Cells in Sputum", Cytometry Part A, vol. 60A, 2004, 1-7.

Krantz, Seth B., et al., "Health Risks from Computed Tomographic Screening", Thorac Surg Clin, vol. 25, 2015, 155-160.

Krombach, Fritz, et al., "Cell size of alveolar macrophages: an interspecies comparison", Environmental Health Perspectives, vol. 105, Supplement 5, 1997, 1261-1263.

Lay, John C., et al., "Flow cytometry of sputum: assessing inflammation and immune response elements in the bronchial airways", Inhal Toxicol., vol. 23, No. 7, 2011, 392-406.

Leckie, M. J., "Sputum T lymphocytes in asthma, COPD and healthy subjects have the phenotype of activated intraepithelial T cells (CD69+ CD103+)", Thorax, vol. 58, 2003, 23-29.

Lemieux, Madeleine E., et al., "Detection of Early-Stage Lung Cancer in Sputum Using Automated Flow Cytometry and Machine Learning", Respir. Res, vol. 24, No. 23, 2023, 1-16.

Li, Gerald, et al., "Automated Sputum Cytometry for Detection of Intraepithelial Neoplasias in the Lung", Analytical Cellular Pathology, vol. 35, 2012, 187-201.

Li, Tianhong, et al., "Genotyping and Genomic Profiling on Non-Small-Cell Lung Cancer: Implications for Current and Future Therapies", Journal of Clinical Oncology, vol. 31, No. 8, 2013, 1039-1049.

Lu, Yusheng, et al., "Isolation and Characterization of Living Circulating Tumor Cells in Patients by Immunomagnetic Negative Enrichment Coupled with Flow Cytometry", Cancer, vol. 121, 2015, 3036-3045.

Maestre-Battle, Danay, et al., "Novel Flow Cytometry Approach to Identify Bronchial Epithelial Cells from Healthy Human Airways", Scientific Reports, vol. 7, No. 42214, 2017, 1-9.

Meehan, Stephen, et al., "AutoGate: automating analysis of flow cytometry data", Immunol Res, vol. 58, 2014, 218-223.

Murray, Peter J., et al., "Nonresolving macrophage-mediated inflammation in malignancy", The FEBS Journal, vol. 285, 2018, 641-653.

National Institute of Health, "A Genomics-Based Classification of Human Lung Tumors", Sci Transl Med, vol. 5, No. 209, 2013, 1-28.

Ng, Alan B. P., et al., "Factors significant in the diagnostic accuracy of lung cytology in bronchial washing and sputum samples. II. Sputum samples", Acta Cytol., vol. 27, vol. 4, 1983, 397-402.

O'Donnell, Erika A., et al., "Multiparameter Flow Cytometry: Advances in High Resolution Analysis", Immune Network, vol. 13, No. 2, 2013, 43-54.

Osterloh, Jens, et al., "Mechanisms of Porphyrinoid Localization in Tumors", J Porphyr Phthalocyaniones, vol. 6, 2002, 305-324.

Papanicolaou Society of Cytopath, "Guidelines of the Papanicolaou Society of Cytopathology for the examination of cytologic specimens obtained from the respiratory tract", Diagn Cytopathol, vol. 21, No. 1, 1999, 61-69.

Paszkiewicz, Geraldine M., et al., "Increased Human Buccal Cell Autofluroescence Is a Candidate Biomarker of Tobacco Smoking", Cancer Epidemiol Biomarkers Prev, vol. 17, No. 1, 2008, 239-244.

Patel, Vineet I., et al., "Transcriptional Classification and Functional Characterization of Human Airway Macrophage and Dendritic Cell Subsets", J Immunol, col. 198, 2017, 1183-1201.

Patriquin, Lara, et al., "Early Detection of Lung Cancer with Meso Tetra (4-Carboxyphenyl) Porphyrin-Labeled Sputum", J Thorac Oncol., vol. 10, No. 9, 2015, 1311-1318.

Pizzichini, E., et al., "Measurement of Inflammatory Indices in Induced Sputum: Effects of Selection of Sputum to Minimize Salivary Contamination", Eur Respir J, vol. 9, 1996, 1174-1180.

Rassmussen-Taxdal, D. S., et al., "Fluorescence of Human Lymphatic and Cancer Tissues Following High Doses of Intravenous Hematopotphyrin", Cancer, vol. 8, No. 1, 1955, 78-81.

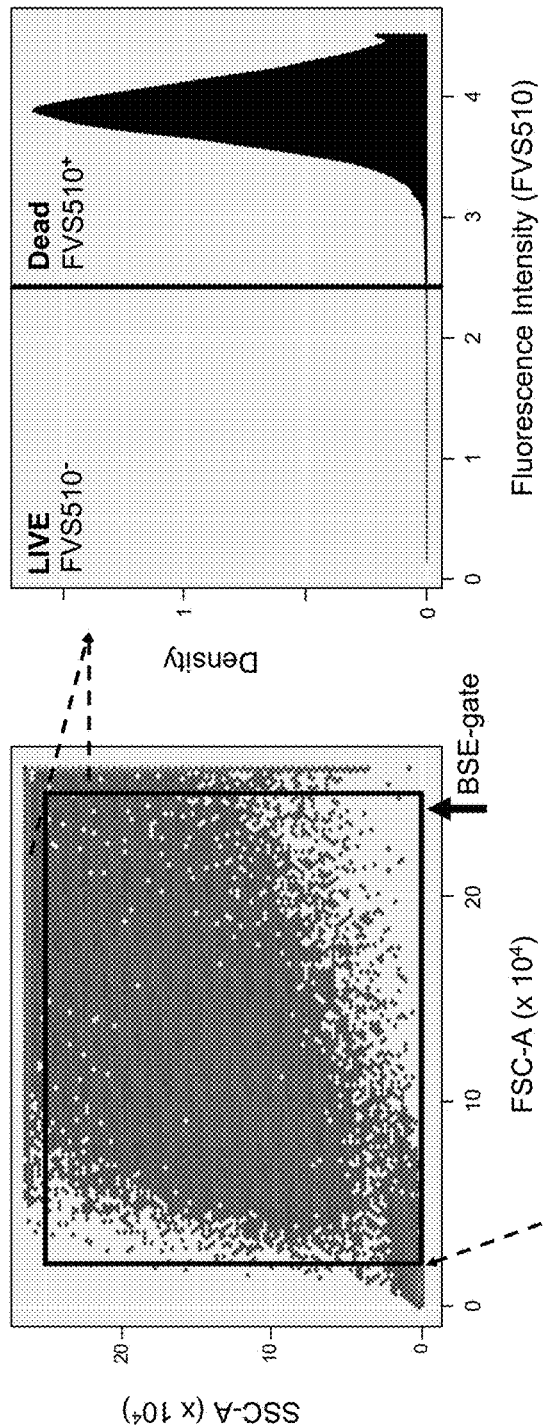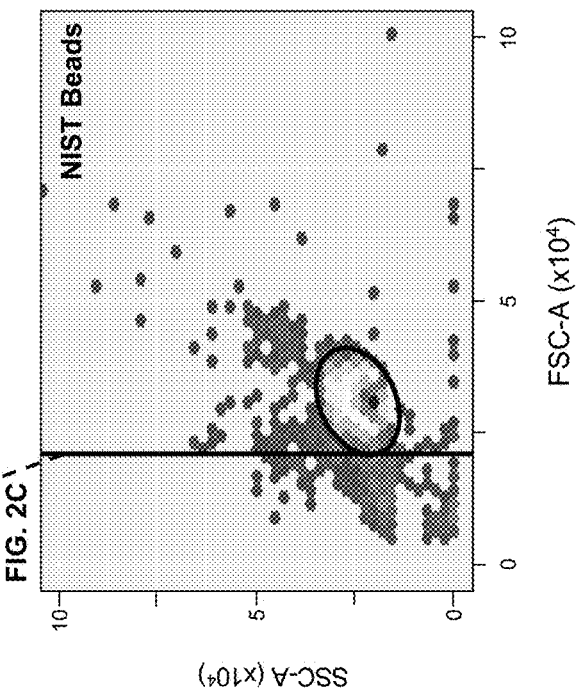

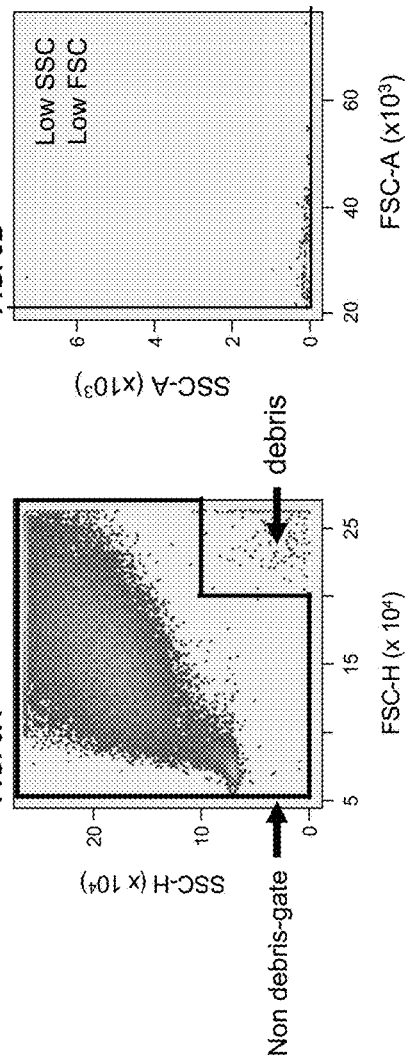
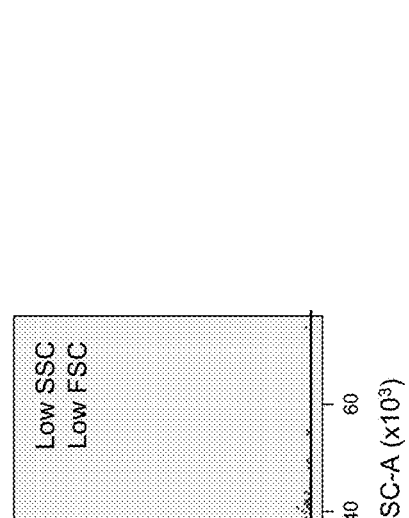
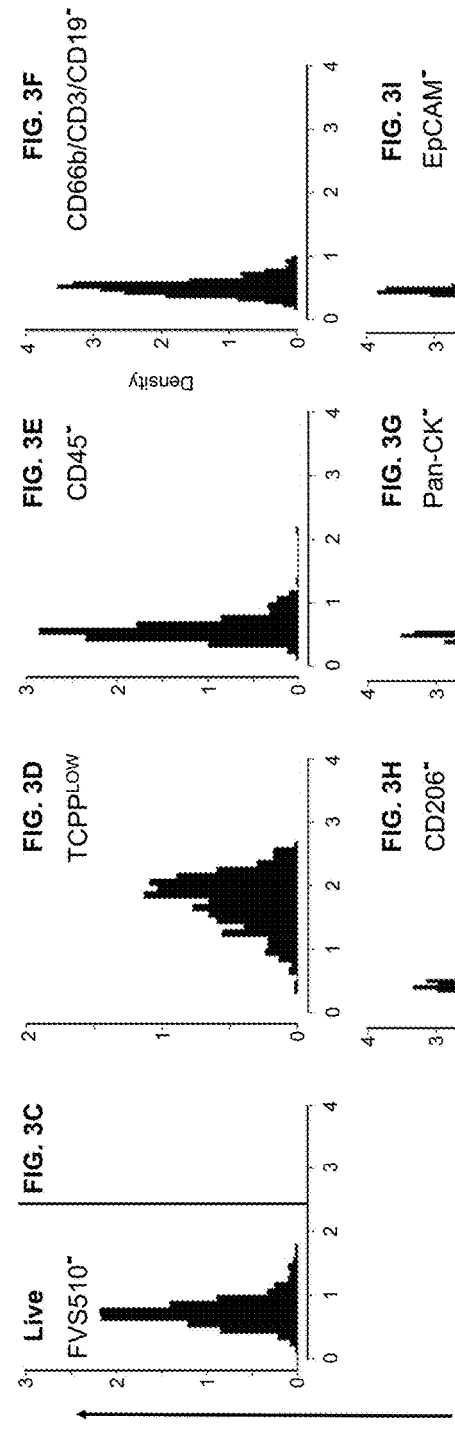
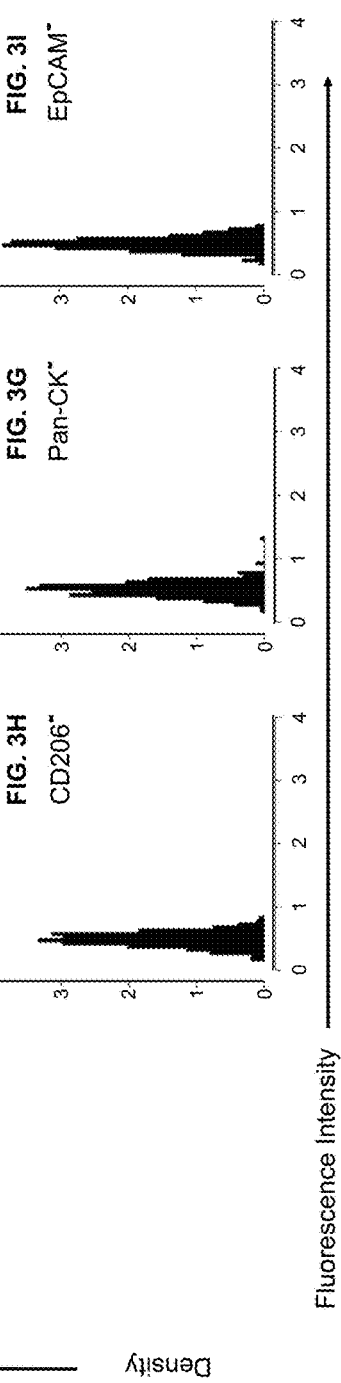

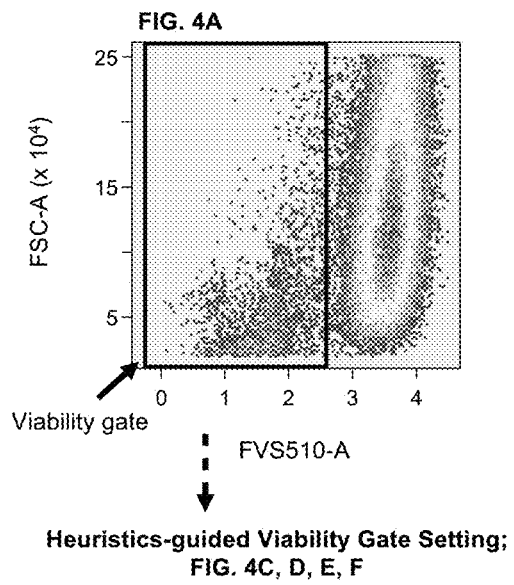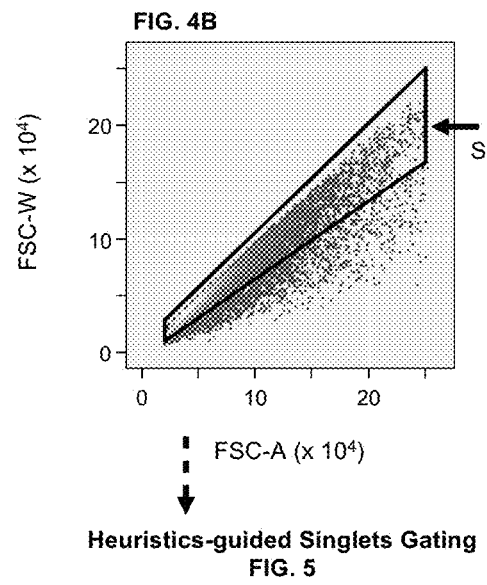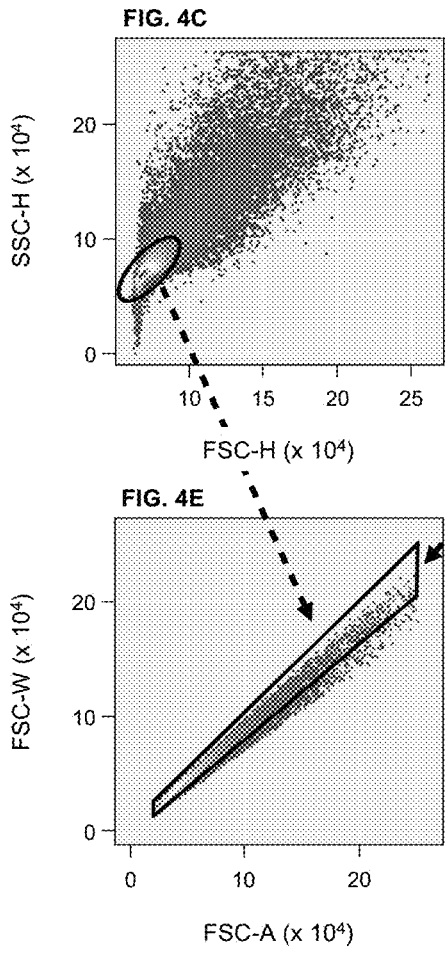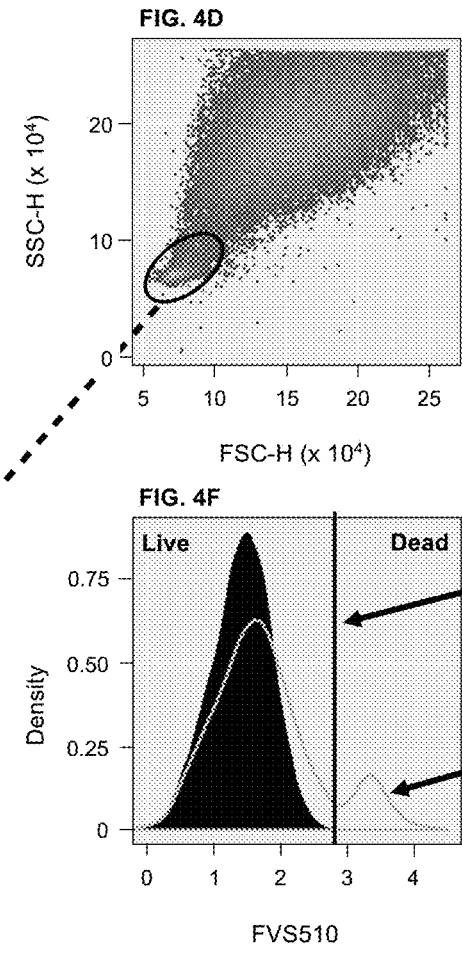

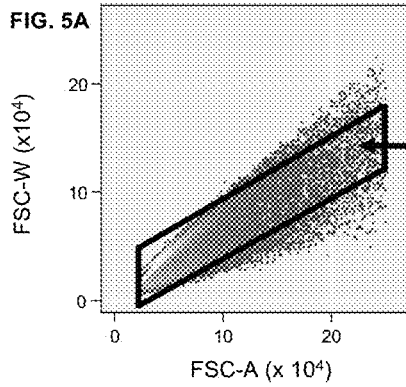
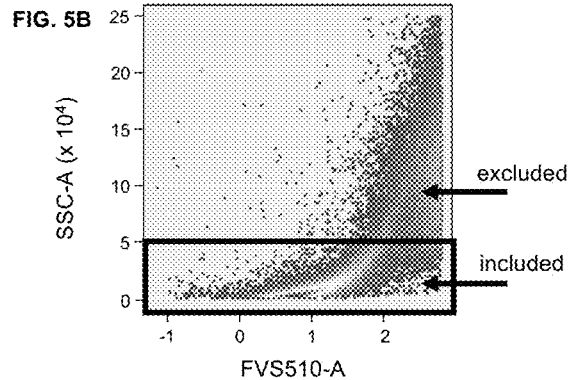
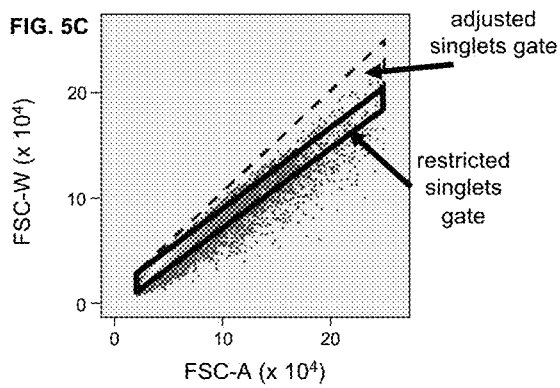
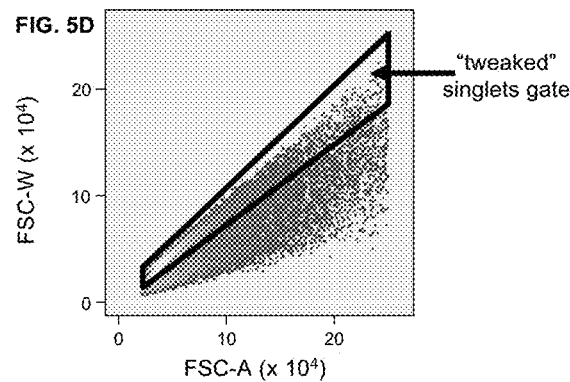
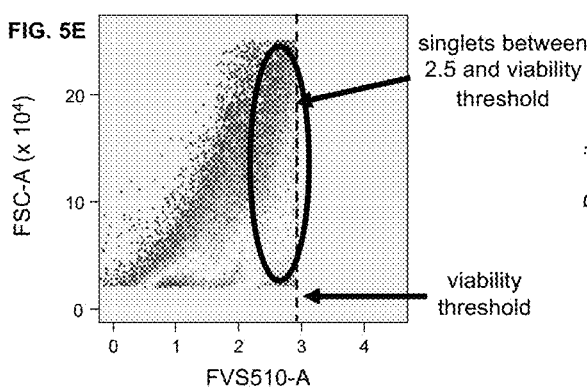
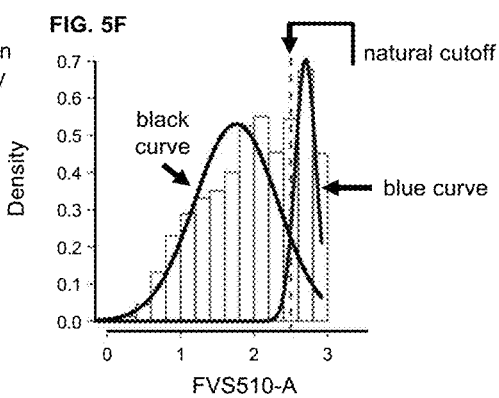
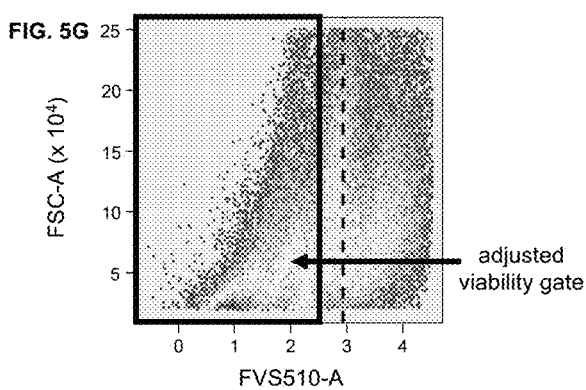
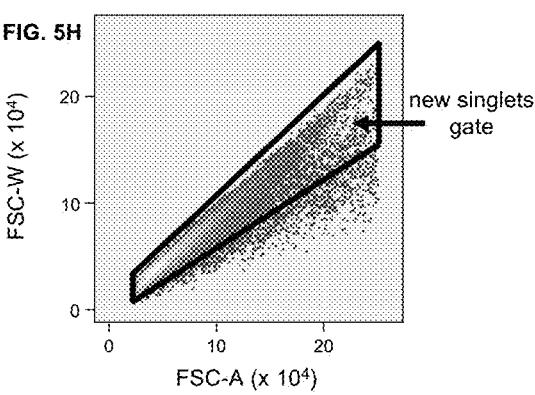

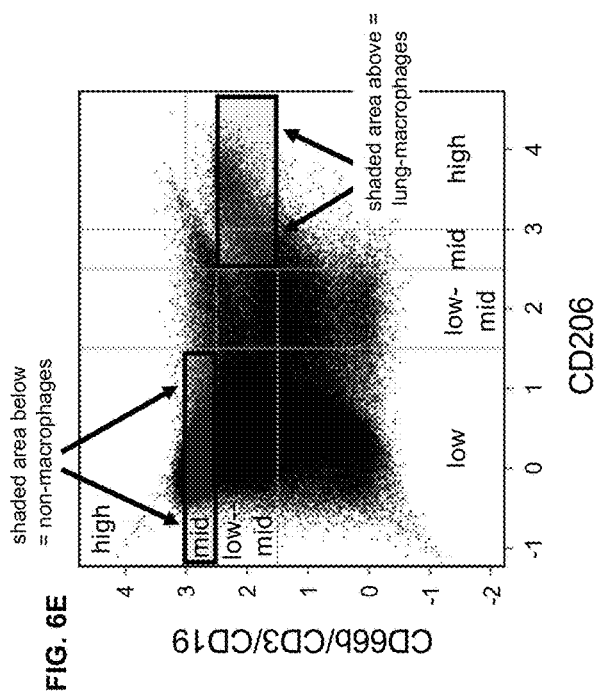
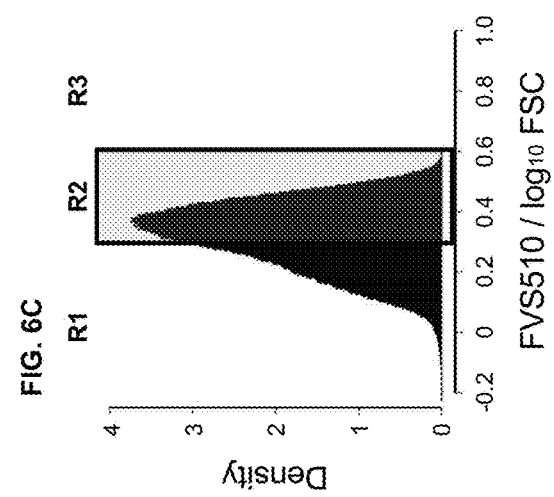
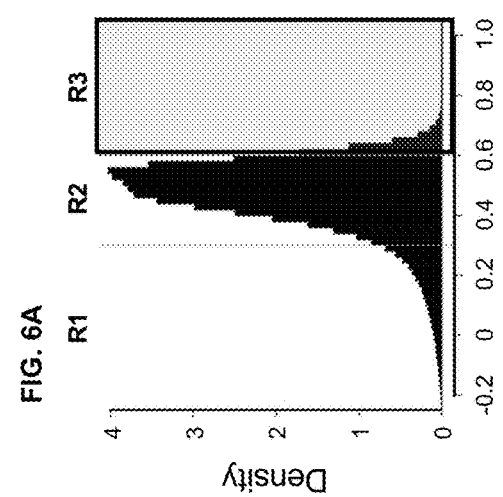
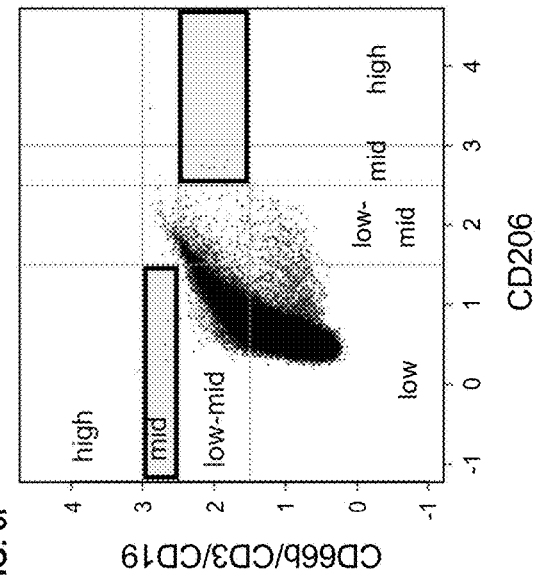
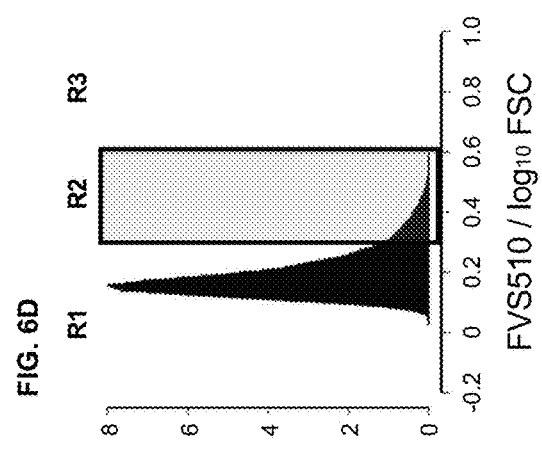
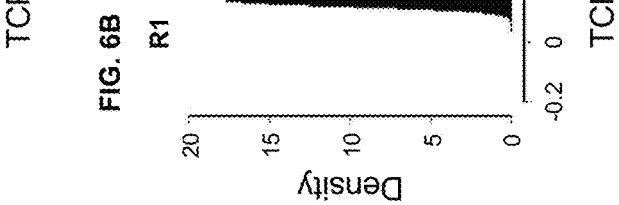

DETECTION OF EARLY-STAGE LUNG CANCER IN SPUTUM USING AUTOMATED FLOW CYTOMETRY AND MACHINE LEARNING

CROSS-REFERENCE TO RELATED APPLICATIONS

This application is a continuation application of International Patent Application PCT/US2022/053353, titled "Detection of Early-Stage Lung Cancer in Sputum Using Automated Flow Cytometry and Machine Learning", filed Dec. 19, 2022, which claims priority to and the benefit of U.S. Provisional Application No. 63/291,247, titled "Detection of Early-Stage Lung Cancer in Sputum Using Automated Flow Cytometry and Machine Learning", filed Dec. 17, 2021, and U.S. Provisional Application No. 63/357,994, titled "Sputum Analysis by Flow Cytometry; an Effective Platform to Analyze the Lung Environment", filed Jul. 1, 2022, and U.S. Provisional Application No. 63/390,826, titled "Detection of Early-Stage Lung Cancer in Sputum Using Automated Flow Cytometry and Machine Learning", filed Jul. 20, 2022. The specification and claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

STATEMENT REGARDING PRIOR DISCLOSURES BY THE INVENTOR OR A JOINT INVENTOR

Not Applicable.

COPYRIGHTED MATERIAL

Not Applicable.

BACKGROUND

Note that the following discussion refers to a number of publications by author(s) and year of publication, and that due to recent publication dates certain publications are not to be considered as prior art vis-a-vis the present invention. Discussion of such publications herein is given for more complete background and is not to be construed as an admission that such publications are prior art for patentability determination purposes.

Lung cancer accounted for an estimated 1.8 million deaths worldwide in 2020. An estimated 130,180 people will die in 2022 from lung cancer in the US alone. Overall, five-year survival of lung cancer remains low at 22.9% because most patients present with advanced disease. The American National Lung Screening Trial (NLST) demonstrated that LDCT screening detects 93.8% of lung cancers among high-risk individuals (i.e., people aged 55-74 with >30 pack-years of smoking and who are currently smoking or have quit smoking in the past 15 years). Low dose computed tomography (LDCT) is the standard of care for lung cancer screening in the United States (US). LDCT has a sensitivity of 93.8% but its specificity of 73.4% leads to potentially harmful follow-up procedures in patients without lung cancer. Thus, there is a need for additional assays with high accuracy that can be used as an adjunct to LDCT to diagnose lung cancer. Low-dose spiral computed tomography may not lead to a clear treatment path when the nodules identified are small.

The NLST showed that LDCT screening leads to an overall 20% reduction in lung cancer specific mortality compared to screening by chest radiography. Unfortunately, 96.4% of positive LDCT scans were false positives in this trial, leading to approximately 90% of patients with a positive LDCT undergoing additional procedures to determine if nodules observed on their LDCT scan were cancerous. These procedures, including imaging, biopsies, and surgical resection can cause serious adverse effects, including death. New guidelines for interpreting LDCT scans and models to estimate the probability that a nodule is cancerous improved the false positive rate (FPR). Still, only a fraction of eligible patients undergoes LDCT screening. A failure to communicate screening benefits and potential harms (whether due to lack of knowledge or time), expenses related to LDCT, lack of LDCT access, and repeated radiation exposure from serial LDCT scans may all contribute to low adoption of screening.

A simple, non-invasive, radiation-free, and cost-effective test that assists physicians in making, or excluding, a lung cancer diagnosis with greater certainty may decrease unnecessary follow-up procedures and increase lung cancer screening. Sputum is an easily obtained bodily fluid that has long been part of lung cancer diagnostics. Developed by Papanicolaou and optimized by Saccomanno, the PAP sputum cytology test was the first lung cancer diagnostic, dating to the 1960s. For this test, two sputum smear slides are labeled with a PAP stain and read by a pathologist specialized in lung cytology. The sensitivity of sputum cytology is highly variable; however, its specificity is very high. A review of 16 published studies on sputum cytology including more than 28,000 patients reported a range of 42% to 97% sensitivity, with an average sensitivity of 66%, while specificity showed an average of 99%.

Sputum cytology's poor sensitivity is attributed in part to inadequate samples and analysis of only a small portion of the sample. Inadequacy can occur because the sample produced is saliva or the mucus/debris/red blood cells within the smear obscure the cellular components needed for accurate analysis. Over time, changes to the original sputum cytology test improved its sensitivity. Nebulizers and assist devices such as the acapella and the lung flute, as well as patient's adherence to proper instructions on how to produce lung sputum samples, have shown to improve a patient's ability to produce sputum. Liquid cytology tests and automated slide preparation devices can diminish the background contaminants of sputum smears and thus increase the quality of slides. Increasing the number of samples read has also been shown to increase the likelihood of finding abnormal cells indicative of lung cancer.

Porphyrins, such as TCPP are currently used as diagnostic reagents in bladder cancer and surgery to identify the edges of that cancerous tissue. Using microscopy, we showed that by labeling sputum cells with the fluorescent porphyrin TCPP, we could distinguish study participants with lung cancer from those without the disease with high accuracy using a slide-based assay (cytology-based methods) and a human grader. Cytology-based methods are of limited utility because reading the slides is time-consuming and requires highly specialized personnel. Moreover, extensive debris and the presence of too many squamous epithelial cells (SECs), or cheek cells, often renders a sample inadequate for diagnosis. Since the slide-based assay is time consuming, often prohibiting the analysis of the entire sample and thereby potentially missing important events and a human grader introduces a subjective bias (also known as operator bias) that is not consistent between different human graders, alternative methods for analyzing sputum to determine the likelihood of cancer would be useful.

Using a flow cytometric platform, the feasibility of analyzing entire sputum samples without clogging the instrument for identifying significant differences between samples obtained from people diagnosed with lung cancer and those obtained from people without the disease is illustrated according to one embodiment of the present invention.

Early detection of lung cancer through screening can increase survival and reduce morbidity. The USA and certain regions of the UK now advocate annual low-dose computed tomography (LDCT) screening for high-risk individuals. A positive LDCT result therefore requires follow-up tests to determine if the nodule is benign or malignant. These medical procedures have inherent morbidity and mortality risks[6] and can impose a serious burden on screening participants and their families, while the associated costs represent a significant financial burden to the patient and society.

Efforts have therefore turned to the development of non-invasive tests that either can be used in conjunction with LDCT or as a stand-alone test to identify people that are at high-risk for having lung cancer and should undergo a LDCT. In both cases, the goal of these tests is to eliminate unnecessary medical procedures for low-risk patients while identifying those with lung cancer at an early stage. One easily accessible material from the lung is sputum which contains a variety of blood cells and exfoliated bronchial epithelial cells[7], including premalignant and malignant cells in patients with lung cancer. We have previously reported on a slide-based assay that was able to classify cancer and non-cancer patients from sputum stained with tetra (4-carboxyphenyl) porphyrin (TCPP). Although 81% accurate, reading labeled slides was time-consuming, subject to observer bias and could potentially miss key low frequency events by under-sampling. A high-throughput approach making use of automated flow cytometry (FCM) for sample analysis of sputum could improve the deficiency of slide-based analysis.

Disclosed embodiments have combined flow cytometry and machine learning to develop a sputum-based test that can assist physicians in decision-making in such cases.

BRIEF DESCRIPTION OF THE PRESENT INVENTION

One embodiment of the present invention provides for a flow cytometer method for analyzing a sputum sample from a subject suspected of having lung cancer. A plurality of cells from the sputum sample from the subject suspected of having lung cancer is obtained, for example a single cell suspension of the sputum sample. The plurality of cells are marked with i) a plurality of cell lineage specific marker compositions, ii) a cell viability composition and iii) a tetra (4-carboxyphenyl) porphyrin (TCPP) composition. For example, i) includes at least 3, or at least 4 or at least 5 or at least 6 of CD206, CD3, CD19, CD66b, CD45, EpCAM, PanCK, and any combination thereof, and any combination may expressly exclude any of CD206, CD3, CD19, CD66b, CD45, EpCAM, PanCK. In a further example, ii) the cell viability composition labels dead cells preferentially to live cells and may include FVS510. The plurality of cells marked with i-iii are analyzed with the flow cytometer to obtain a subpopulation selected for cell size from the plurality of cells based upon an automatically selected bead size exclusion gate. For example, the bead size exclusion gate is set between 5 μm and about 30 μm wherein events less than about 5 μm and greater than about 30 μm are not further analyzed. For example, the analyzing step comprises obtaining, from the plurality of cells, flow cytometry values for side scatter, forward scatter, fluorescence from TCPP, fluorescence from the cell viability composition, and fluorescence from the plurality of cell lineage specific marker compositions. From the cell size selected subpopulation, a viable singlet population of cells is selected using an automated non-debris gate (for example the automated non-debris gate excludes the majority of dead cells from the non-debris population) and an automated singlets gate (for example the automated singlets gate is applied to the population of cells selected in the automated non-debris gate). From the viable singlet population of cells, flow cytometer values are obtained based upon the plurality of cell lineage specific marker compositions, the viability marker and the TCPP marker. A trained classifier is applied to a meta data (for example age) from the subject and the flow cytometric values obtained. Based upon the application of the trained classifier, a classification for the sputum sample is generated wherein the classification is selected from a plurality of classification options comprising cancer and non-cancer. For example, the trained classifier is $$\text{Cancer} \sim b_0 + b_1 * \text{age} +$$
$$b_2 * CD206^{low}CD66b/CD3/CD19^{mid} + b_3 * \frac{FVS510}{FSC - A_{log_{10}}}[R2] +$$
$$b_4 * \frac{TCPP}{SSC - A_{log_{10}}}[R3] - b_5 * \text{age} * \frac{FVS510}{FSC - A_{log_{10}}}[R2]$$

wherein $b_0$-$b_5$ coefficients are determined by fitting the trained classifier to a plurality of sputum samples used to build the classifier.

In one embodiment the plurality of cell lineage specific marker compositions include fluorescent anti-CD206, fluorescent anti-CD3, fluorescent anti-CD19, and fluorescent anti-CD66b. In another embodiment the classifier is an equation of a line including coefficients $b_0$-$b_5$ determined by fitting the classifier model to a specific set of samples used to build the classifier.

Another embodiment provides for a system for automated analysis of flow cytometry data, the system comprising a computer processor in communication with a memory having stored therein flow cytometry data from a plurality of markers in a plurality of cells from a sputum sample of a subject wherein the plurality of markers include i) a plurality of cell lineage specific marker compositions, ii) a cell viability composition and iii) a tetra (4-carboxyphenyl) porphyrin (TCPP) composition. For example, i) includes at least 3, or at least 4 or at least 5 or at least 6 of CD206, CD3, CD19, CD66b, CD45, EpCAM, PanCK, and any combination thereof, and any combination may expressly exclude any of CD206, CD3, CD19, CD66b, CD45, EpCAM, PanCK. In a further example, ii) the cell viability composition labels dead cells preferentially to live cells and may include FVS510. The system further provides for a computer-program product embodied in a non-transitory computer readable medium, the computer-program product comprising instructions for causing the computer processor to do the following. Receive the flow cytometry data acquired from the plurality of cells from a sputum sample. Select from the plurality of cells in the sputum sample a subpopulation of cells automatically selected based upon application of automatic gates selected from a bead size exclusion gate, a viability gate and a singlets gate. For example, the bead size exclusion gate is set between 5 µm and about 30 µm wherein events less than about 5 µm and greater than about 30 µm are not further analyzed, for example the automated non-debris gate excludes the majority of dead cells from the non-debris population, for example the automated singlets gate is applied to the population of cells selected in the automated non-debris gate. Determine, from the subpopulation, flow cytometric values of interest for the plurality of cell lineage specific marker compositions, the viability marker and the TCPP marker. Apply a classifier to the flow cytometric values of interest and a meta data of the subject, for example, the trained classifier is $$Cancer \sim b_0 + b_1 * age +$$
$$b_2 * CD206^{low}CD66b/CD3/CD19^{mid} + b_3 * \frac{FVS510}{FSC - A_{log_{10}}}[R2] +$$
$$b_4 * \frac{TCPP}{SSC - A_{log_{10}}}[R3] - b_5 * age * \frac{FVS510}{FSC - A_{log_{10}}}[R2]$$

wherein $b_0$-$b_5$ coefficients are determined by fitting the trained classifier to a plurality of sputum samples used to build the classifier.

Generate an output at a display device with an identification of one or more classifications for the sputum sample comprising cancer or non-cancer.

Another embodiment of the present invention provides for a non-transitory computer-readable medium comprising program code that, when executed, causes processing circuitry to do the following. Obtain flow cytometer values (for example from for side scatter, forward scatter, fluorescence from TCPP, fluorescence from the cell viability composition, and fluorescence from the plurality of cell lineage specific marker compositions) for a viable singlet population of a subject's sputum cells based upon a plurality of cell lineage specific marker compositions (for example the plurality of cell lineage specific marker compositions are selected from fluorescent anti-CD206, fluorescent anti-CD3, fluorescent anti-CD19, and fluorescent anti-CD66b), a viability marker (for example FVS510 but not limited thereto) and a TCPP marker. Apply a trained classifier to a meta data from the subject and the flow cytometric values obtained. Generate, based upon the application of the trained classifier, a classification for the sputum sample wherein the classification is selected from a plurality of classification options comprising cancer and non-cancer. The method of claim 1 wherein the cell viability composition labels dead cells preferentially to live cells. In one embodiment a bead size exclusion gate is set to exclude events less than about 5 µm and greater than about 30 µm and selects, from the sputum sample, for a subpopulation of cells having a cell size not excluded by the bead size exclusion gate and from this population is selected a viable singlets population. In another embodiment, the viable singlets population is selected with the automated non-debris gate which excludes the majority of dead cells from the non-debris population for further analysis. In one embodiment, the trained classifier is $$Cancer \sim b_0 + b_1 * age +$$
$$b_2 * CD206^{low}CD66b/CD3/CD19^{mid} + b_3 * \frac{FVS510}{FSC - A_{log_{10}}}[R2] +$$
$$b_4 * \frac{TCPP}{SSC - A_{log_{10}}}[R3] - b_5 * age * \frac{FVS510}{FSC - A_{log_{10}}}[R2]$$

wherein $b_0$-$b_5$ coefficients are determined by fitting the trained classifier to a plurality of sputum samples used to build the classifier.

One aspect of one embodiment of the present invention provides a flow cytometric method for example automated FCM for analyzing sputum from a subject suspected of having lung cancer wherein the method includes one or more of the following: 1) eliminating from the analyzed sputum sample contaminants, both debris and squamous epithelial cells (SECs, common contaminants from the oral cavity), using a gating strategy defined by for example bead standards and a viability dye to generate of population of singlet cells; 2) including a quality control parameter to detect alveolar macrophages in the sample thereby verifying the lung origin of each sputum sample, 3) defining a numerical cutoff for a population of cells of interest for sample adequacy for providing reliable analysis, 4) obtaining optical characteristics from sputum-derived cells labeled with one or more of leukocyte- and/or epithelial-cell lineage specific markers such as fluorescent specific antibodies or fragments thereof and TCPP to identify significant differences between samples obtained from people diagnosed with lung cancer and those obtained from people without the disease, 5) obtaining a subject's meta data for example age and/or smoking years information, 6) applying a classifier based upon characteristics selected from the output of items 1-5, and 7) determining whether the sputum sample analyzed is above or below the cancer likelihood numerical value. If cancer or a cancer likelihood is identified, the subject is processed for further testing.

One embodiment of the present invention provides for a computer implemented method for classifying a lung sputum sample from a test subject at risk of a lung cancer comprising receiving, on at least one processor, data from the test subject. The at least one processor is used to evaluate the data using a classifier which is an electronic representation of a classification system, the classifier trained using a plurality of electronically stored training data sets, each one of the plurality of training data sets representing a separate training data set wherein each separate training data set represents an individual subject and data for the respective subject, each training data set further comprising a determination with respect to the characterization of a lung cancer if present in the respective subject, wherein the classification system comprises identification of cancer or non-cancer for the lung sputum sample. The at least one processor is used to evaluate a classification of a test sputum sample from a test subject based on the evaluating step. In one embodiment the data comprises flow cytometric data, subject meta data, or a combination thereof. For example, the flow cytometric data is obtained from the sputum sample labeled with a plurality of markers in a plurality of cells from the sputum sample of the subject wherein the plurality of markers include i) a plurality of cell lineage specific marker compositions, ii) a cell viability composition and iii) a tetra (4-carboxyphenyl) porphyrin (TCPP) composition. The subject meta data includes one or more of sex, age, genetic information, biomarker data, smoking status, medical history or a combination thereof. In a further embodiment, a non-transitory computer readable medium storing an executable program comprises instructions to perform the computer implemented classification method.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings:

FIGS. 2A and 2B illustrate automated gating of FCM data according to one embodiment of the present invention. FIG. 2A illustrates bead size exclusion (BSE) gate parameters are set on the entire sputum sample. FIG. 2B illustrates that events above the BSE-gate threshold set $2.5 \times 10^5$ based on the observation for both forward (FSC) and side (SSC) scatter area are dead cells. FIG. 2C illustrates a dot plot of NIST beads from the automated flowClust analysis to illustrate how it is used to set the bottom left threshold of the BSE-gate.

FIG. 3A-3I illustrate automated gating of FCM data according to one embodiment of the present invention. FIG. 3A illustrates that in some samples, events appear in the lower righthand corner ("debris") of forward scatter-height (FSC-H) vs side scatter-height (SSC-H) plots. FIG. 3B illustrates that the debris identified events in FIG. 3A have very low light SSC-A characteristics, very unusual for human cell populations. FIG. 3C-I are histograms with density identified on the Y axis and Fluorescence Intensity identified on the X axis. FIG. 3C illustrate the debris identified events illustrated in FIG. 3A are identified as live because they lack staining with the viability dye (FVS510), a dye that preferentially stains dead cells. FIG. 3D illustrates that the debris identified in FIG. 3A when labeled with TCPP express a low level of TCPP. FIG. 3E illustrates that the debris events identified in FIG. 3A are negative for CD45. FIG. 3F illustrates that debris events identified in FIG. 3A, when incubated with a compound, for example an antibody, that specifically recognizes CD66b, a compound, for example an antibody, that specifically recognizes CD3 and a compound, for example an antibody, that specifically recognizes CD19, are negative for CD66b/CD3/C19. FIG. 3H illustrates that debris events identified in FIG. 3A when incubated with a compound, for example an antibody, that recognizes CD206 are negative for CD206. FIG. 3G illustrates that debris events identified in FIG. 3A, when incubated with a compound that specifically recognizes Pan-CK, are negative for Pan-CK. FIG. 3I illustrates that debris events identified in FIG. 3A, when incubated with a compound that specifically recognizes EpCAM, is negative for EpCAM. Debris events identified by the profile in FIG. 3A are gated out to avoid false-positive results according to one embodiment of the present invention.

FIG. 4A-4E illustrate dot plot analysis and FIG. 4F illustrates histogram analysis of non-debris events identified as illustrated in FIG. 3A according to one embodiment of the present invention.

FIG. 5A-E and FIG. 5G-H illustrate dot plots of events identified wherein debris is excluded as in FIG. 2A and FIG. 3A and FIG. 5F illustrates a histogram of events identified wherein debris is excluded as in FIG. 2A and FIG. 3A.

FIGS. 6A and 6B illustrate histograms with TCPP/$\log_{10}$ SSC on x-axis and Density on y-axis displaying cells stained with TCPP. FIGS. 6C and 6D illustrate histograms with FVS510/$\log_{10}$ FSC on x-axis and Density on y-axis displaying cells stained with FVS510 (viability dye). FIG. 6E-F illustrate dot plots with CD206 on x-axis and CD66b/CD3/CD19 on y-axis.

Figure 1:
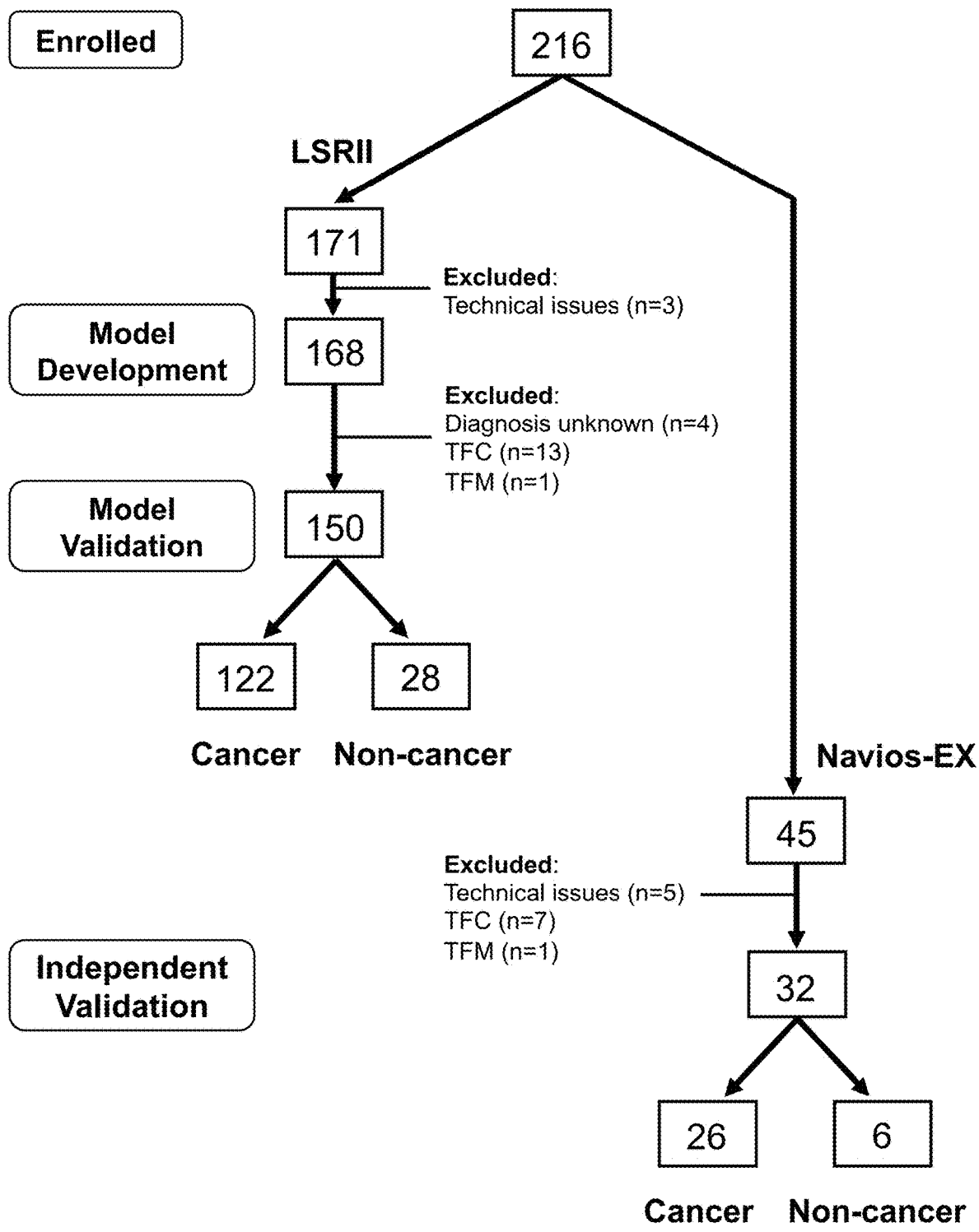
FIG. 1 illustrates a flow chart of samples identified according to one embodiment of the present invention.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

DETAILED DESCRIPTION OF THE PRESENT INVENTION

Sputum is a biological fluid that can be obtained non-invasively and can be dissociated to release its cellular contents, providing a snapshot of the lung environment. Sputum can be made into a single cell suspension and stained with both TCPP and fluorochrome-conjugated antibodies for manual and automated flow cytometry (FCM) analysis. Automated FCM allows analysis of the sputum sample for cancer or cancer-associated cells using TCPP while a panel of compounds specific for cell lineage markers are used to interrogate the sputum sample to provide information regarding the lung environment from the subject providing the sputum sample to capture predictive features of the sputum sample using a trained classifier. In one embodiment the sputum sample analyzed via flow cytometry contains about 10,000 cells in the subpopulation that is selected for via automated gating and is analyzed and classified in real time by the system and method disclosed herein. In other embodiments the total number of cells in the subpopulation may be between about 1,000-5,000, between about 5,000-10,000, between about 10,000-100,000. The data acquired via automated FCM may be stored and analyzed at a later time instead of analyzed in real time as the data is acquired.

Over the past 20 years, the field of automated FCM analysis has produced powerful software tools to identify cell populations that correlate with clinical outcomes and manage ever more complex FCM data sets. Much effort has focused on reproducing expert analysis of FCM data to automate the identification of cell populations, for example in human immune profiling. Such data-driven algorithms can now match or exceed human expertise and the analysis of the acquired FCM data can be fully automated, thereby eliminating potential operator bias. However, application of automated flow cytometry analysis of sputum samples for determination of lung health has proven difficult due to the complex nature of the lung environment, the interplay between inflammatory markers and disease and the often rare occurrence of the cells of interest in the sputum sample. Complicating factors when analyzing sputum samples for lung health includes: variable size of the sputum sample since a sample that is too small will contain too few cells for analysis and samples that are too large might dilute events of interest when events are rare. Cytology review of a sputum sample on a slide is limited to only a piece of the sample thereby decreasing the sensitivity of slide assay and which is depending on the skill of the observer to see meaningful events on the slide. Smear on the slide and overlapping of cells on the slide decrease the utility of cytology to provide a meaningful analysis when looking for rare events in a sample. Further cytology does not provide a wholistic picture as to what non-malignant cells might be present in the sample and their incidence in the sample and what that information means for the health of the lung as it relates to lung cancer or other disease in the lung.

Another aspect of one embodiment of the present invention provides for a supervised learning approach to develop an assay that combines automated FCM data acquisition from induced sputum to isolate viable single cell events with machine learning techniques to classify patient samples as cancer or non-cancer.

In one embodiment of the present invention, a developed lung cancer/non-cancer classifier performs well at 82% sensitivity and 88% specificity. Further, the classifier achieves comparable sensitivity and specificity when applied to an independent set of samples collected using a different flow cytometer platform (Navios EX) than the one used for assay development (LSRII). One aspect of tan automated FCM lung assay system and method according to one embodiment of the present invention is that the assay is also accurate in early stages (I and II) and in cases where lung nodules are small (<20 mm diameter). The system and method of one embodiment of the present invention is robust to differences in sample handling and processing and captures important predictive factors of early lung carcinogenesis.

In one embodiment of the present invention, sputum was obtained from current and former smokers, for example with a 20+ pack-year smoking history, and who were either confirmed to have lung cancer or at high risk of developing the disease. Dissociated sputum cells were counted, viability determined, and labeled with a panel of markers to determine cell types, for example anti-CD45 to separate leukocytes from non-leukocytes but other markers are possible as will be discussed herein. After excluding debris and dead cells, including squamous epithelial cells, we identified reproducible population signatures and confirmed the samples' lung origin. For example, in addition to labeling the sputum sample with leukocyte and epithelial-specific fluorescent antibodies, the fluorescent meso-tetra(4-carboxyphenyl) porphyrin (TCPP), known to preferentially stain cancer (associated) cells was also used to label the sputum sample. Differences in cell characteristics, population size and fluorescence intensity useful in distinguishing cancer samples from high-risk samples were identified.

In one embodiment of the present invention, an analysis pipeline combining automated flow cytometry processing with machine learning was developed to distinguish cancer from non-cancer cells in the sputum samples. Flow data and patient features were evaluated to identify predictors of lung cancer. A training set was used to fit the model while the remaining samples were used for independent validation (test set). The approach was further validated on a second group of samples processed on a different flow cytometry platform.

Referring now to FIG. 1, Utilization of Sputum Samples is illustrated in the flow chart. Of the 171 samples run on the LSRII flow cytometer that were originally considered (136 non-cancer; 31 cancer; 4 with unconfirmed health status), 168 samples were used for model building and analysis pipeline development. This included 4 samples for which we did not have a definitive disease status because the addition of unlabeled samples is helpful in model building. In addition, 14 samples flagged as ineligible based on cell counts (see below) were also used in the model development to better capture the distribution of the underlying data and help make generalization of the model more robust to sample noise. Three samples could not be used at all due to technical problems during acquisition.

One hundred and fifty samples were ultimately used for the model validation phase (122 non-cancer; 28 cancer). Eighteen of the 168 samples were omitted: thirteen included too few cells for an accurate analysis, one included too few alveolar macrophages thereby failing to confirm it as a lung sample, and four samples were excluded because their cohort status could not be confirmed. An independent validation of the automated analysis was performed with 32 new samples. Participants adhered to the same enrollment criteria and samples were processed with the same protocol as the previous sample set. Although a different flow cytometer (Navios EX) was used to run the second set of samples, the same model and coefficients were used to analyze the data for both instruments. One hundred and seventy-one samples run on the LSRII were originally considered (136 high-risk; 31 confirmed cancer; 4 unconfirmed); 150 samples were ultimately used for the automated analysis pipeline development (122 high-risk; 28 confirmed cancer). Of the 21 samples that were omitted, thirteen included too few cells for an accurate analysis, one included too few alveolar macrophages thereby failing to confirm it as a lung sample, and three showed technical problems that occurred during acquisition. An additional four samples were excluded because their cohort status could not be confirmed. Of the 45 samples processed for the Navios EX, seven were excluded because of too few cells, one because of too few macrophages and five because of technical problems (one during processing and four with the flow cytometer). The remaining samples consisted of 26 high-risk and six cancer samples.

Referring now to FIG. 2A, bead size exclusion (BSE) gate parameters are set on the entire sputum sample. FIG. 2B illustrates that events above the BSE gate threshold set $2.5 \times 10^5$ based on the observation for both forward (FSC) and side (SSC) scatter area are dead cells. FIG. 2C illustrates a dot plot of NIST beads from the automated flowClust analysis to illustrate how it is used to set the bottom left threshold of the BSE gate. A bottom left threshold of the BSE gate is derived from the automated NIST bead flowClust analysis. Single-cell suspensions from three-day sputum samples were labeled with a viability dye to exclude dead cells, antibodies to distinguish cell types and a porphyrin to label cancer-associated cells and run on a flow cytometer.

One step towards development of a computer automated lung cancer assay is the automated flow cytometer (FCM) identification of viable single cells (which includes the sequence of events illustrated by FIGS. 2A; 3A; 4A; 4B according to one embodiment of the present invention). In one embodiment of the assay, the sample preparation component of the method consists of multiple assay tubes, for example one assay tube may be labelled with blood cell markers ("blood tube") and another assay tube may be labelled with an epithelial cell marker ("epithelial tube"). For example, both tubes may contain fluorescent anti-CD45 antibodies which selectively bind blood cells, as well as a viability dye to facilitate viability gating (see Viability gate of FIG. 4A) to eliminate populations of dead cells, including squamous epithelial cells (SECs), from further analysis and TCPP to identify cancer or cancer-associated cells. Cells in the blood tube may, in addition to CD45 or as an alternative to CD45, also be stained with anti-CD206 (a marker of lung macrophages) and/or anti-CD3 (a marker of T-cells), and/or anti-CD19 (a marker of B-cells) and/or anti-CD66b (a marker of granulocytes). Cells in the epithelial tube can be stained with a pan-cytokeratin (panCK) antibody and/or an antibody to the epithelial cell adhesion molecule (EpCAM). A viability dye, a TCPP cell marker and a blood cell marker(s) and an epithelial cell marker(s) can be distinguished from each other based upon their optical characteristics, for example fluorescence. In one embodiment of the present invention, fluorescence intensities, forward scatter, and side scatter of a cell subpopulation selected from a more inclusive population of cells based upon selection criteria including one or more of bead size exclusion gating, singlets gating, viability dye gating, cell lineage marker gating and TCPP gating of flow cytometry sputum data were used for downstream numerical analysis.

In addition, in one embodiment, a control sample may include one or more of the following: polystyrene beads of known diameter about (5-30 µm NIST beads), compensation sample for each fluorochrome channel used, unstained sputum sample, and cell lineage/type marker sample (for example an antibody isotype sputum control). Each sample tube corresponds to a single Flow Cytometry Standard (fcs) file which contains sample metadata and per event values for each light and fluorescence channel acquired plus a Time parameter recorded as the content of the sample tubes are interrogated and/or acquired by the flow cytometer.

SECs are highly auto-fluorescent and can potentially result in false positive events when sputum samples are interrogated and/or analyzed by flow cytometry. Therefore, elimination of SECs from a population of cells analyzed during the analysis of the sputum sample is a step in one embodiment of the lung assay. The inventors identified that neither physical elimination of SEC's by filtration prior to analysis nor a negative size selection at the time of analysis resulted in excluding the SEC cells. A live/dead cell discriminator (FVS510) to eliminate SECs from the population of cells from the sputum sample analyzed was one solution to exclude SEC's from the population of events either acquired by the flow cytometer and/or analyzed in downstream analysis.

Dissociated sputum cells within the 5-to-30 µm size parameters were analyzed for viability as sputum cells of interest and SECs fall into this gated area. The cutoff for FVS510 positivity was based on the unstained control. Back-gating the dead cells onto the sputum light scatter profile showed these cells had a general high SSC, which can be expected for SECs. To confirm that SECs were dead, sputum cells were sorted into dead and live cell populations. Aliquots of the pre-sorted sample and the sorted populations were transferred to cytospins and stained with Wright-Giemsa. These slides showed that SECs are predominantly among the dead cells while live cells sorted from the same sample included hematopoietic and non-hematopoietic cells, and a few contaminating SECs. Therefore, it was determined that sputum samples can be analyzed by flow cytometry while excluding contaminating SECs with a viability gate.

FIG. 2A illustrates the step of restricting events to be analyzed downstream based on forward scatter area (FSC-A) and side scatter area (SSC-A), both reasonable surrogates for cell size. A two-dimensional cluster gate was used to find the dominant peak of 5 µm NIST beads in FSC-A vs SSC-A (FIG. 2C). The lower FSC-A limit of the bead cluster was set as the minimum sample FSC-A to exclude small particulates and debris. Upper limits of $2 \times 10^5$ were set on both FSC-A and SSC-A since events above those thresholds were found to be dead (FVS510$^+$) cells (FIG. 2A and FIG. 2B).

FIGS. 3A-3B illustrate dot plot data setting according to one embodiment of the present invention. Referring now to FIG. 3A, in some samples, events appear in the lower righthand corner of FSC-H vs SSC-H plots. These events are gated out of further analysis to avoid including the events/cells as live, marker negative, TCPP low cells as shown in FIGS. 3C-3I. FIG. 3A illustrates that a temporary flowClust gate (Non debris-gate) is set on Non-debris events in FSC-H vs SSC-H to retain mostly live cells for eventual FVS510 tail gating ("core viable gate"). FIG. 3B illustrates a dot plot of debris having low SSC-A and low FSC-A and shows the identification of additional debris (FIG. 3A) and that this debris shows a light scatter profile that is not typical of cell populations. This needs to be excluded, because additional analysis (FIG. 3A-I) shows that this debris can be mistaken for live cells (FIG. 3C) that are low to negative for the other markers (FIG. 3D-3I).

Events within the bead size exclusion (BSE) gate were then restricted to exclude a population with unusual FSC and SSC height profiles (FIG. 3A) and a staining profile that might result in their inappropriate inclusion in downstream analyses. Exclusion of unusual-looking populations is warranted in general.

Referring now to FIG. 4A, a viability gate (solid rectangle) is set on the remaining events based on FVS510-A fluorescence. Cells within the viability gate (which is set at the threshold of FVS510-positivity) were retained (FIG. 4A). Setting the viability gate was challenging for some samples due to patient-to-patient variability in sputum cell composition. In those cases, heuristic-guided viability gate setting was used (FIGS. 4C-F).

Referring now to FIG. 4B, a singlets gate (solid line polygon) is set on all viable events (events inside the viability gate of FIG. 4A). The identified (viable) singlets are used for downstream numerical analysis. Setting the singlets gate was challenging for some samples due to patient-to-patient variability in sputum cell composition. In those cases, heuristic-guided singlet gate setting was used (FIGS. 5A-H).

FIGS. 4C-4E illustrate dot plots of Heuristics-guided Viability Gate Setting. Subpopulations most likely to contain viable singlet cells (i.e., cells relatively small in area and height in light scatter channels) are used to guide the positioning of the viability gate (FIGS. 4C and 4D). FIG. 4C illustrates a sample with a low percentage of high SSC/FSC cells. A temporary flowClust gate that is set on all non-debris events in FSC-H vs SSC-H to retain mostly live cells for eventual FVS510 tail gating ("core viable gate"). FIG. 4D illustrates that for samples with <10% events in the core viable gate, flowClust was rerun more inclusively by increasing the "quantile" parameter to 0.99. FIG. 4E illustrates a temporary singlets gate set on core viable events, forcing the capture of the upper diagonal by setting the top right point to $2.5 \times 10^5$ on both axes. FIG. 4F illustrates a histogram of the FVS510 staining (viability dye) of the events identified in the temporary singlets gate in FIG. 4E. The viability cutoff is set automatically on the core viable singlets (black histogram). The line identified as "blue curve" is the full Non-debris FVS510 profile for comparison. The vertical line identified as "red bar" indicates the viability gate cutoff. Viable events are to the left of the viability gate cutoff. All temporary gates are removed once the viability cutoff was determined. The thus determined viability gate cutoff is used to now set the viability gate on the entire samples (shown in FIGS. 4C and 4D).

Referring now to FIGS. 5A-5D, Heuristics-guided Singlets Gating is illustrated. In some cases, cells with a high SSC-A (see e.g., FIG. 3A) throw off singlets gating on the full viable cell population. FIG. 5A illustrates a dot plot with FSC-A on x-axis and FSC-W on y-axis and an automatically assigned singlets gate (solid polygon) on a sample with too many high SSC-A cells. The wide singlets gate is an incorrect gate. Such a gate can be corrected by fitting the gate to a temporary subpopulation of viable cells excluding the high SSC-A cells (FIG. 5B). FIG. 5B illustrates a dot plot with FVS510-A on the x-axis and SSC-A on the y-axis with a temporary gate set on SSC-A that excludes events above about $5 \times 10^4$. FIG. 5C illustrates a singlets gate (using the cells identified in the get shown in FIG. 5B) that is fitted automatically to the restricted population (solid line polygon) and adjusted to include the upper diagonal by setting the upper right corner to $2.5 \times 10^5$ on both axes (dashed polygon). FIG. 5D illustrates a refined singlets gate (solid polygon) applied to the full viable population when the temporary gates are removed (compare the refined polygon in FIG. 5D to the singlets gate (solid polygon) in FIG. 5A.

Referring now to FIG. 5E-5H, Heuristics-guided Singlets Gating is illustrated for a different type of case that throws off setting the singlets gate. In these cases, a population representing about >10% of singlets lies between about 2.5 (logical scale) and the viability threshold that throws of setting the viability gate and singlets gate. This can be corrected by resetting the viability gate and fitting the singlets gate to a more restricted viable population. FIG. 5E shows a dot plot of such a difficult case, having FVS510-A on the x-axis and FSC-A on the y-axis. The solid oval represents the >10% of singlets is and the dashed line represents the viability threshold. FIG. 5F illustrates a population mixture analysis illustrated in a density histogram of the FVS510 staining. The analysis highlights the difference in signal distribution of the rightmost population identified by the solid oval in FIG. 5E (identified as blue curve) relative to the bulk of the events positioned left from the oval in FIG. 5E (identified as black curve) and suggests a natural cutoff at 2.5 (dashed line) in these unusual cases. FIG. 5G illustrates a dot plot with the adjusted viability gate (solid line box) which replaces the one found by automated tail gating (dashed line). FIG. 5H illustrates a dot plot with FSC-A on the x-axis and FSC-W on the y-axis with a new singlets gate (solid polygon) calculated for the refined viable cell population identified in the "adjusted viability gate shown in FIG. 5G.

A "singlets" gate (FSC-Area vs FSC-Width) was used to exclude cell doublets or small aggregates (FIG. 5A). Setting the singlets gate automatically was challenging due to patient to patient sample variability. In some samples, high SSC-A cells are included in the viable cell population and distort the results of the singlets gating algorithm. This can be corrected by fitting the gate to a temporary subpopulation excluding most of these high SSC-A events (FIG. 5B). In other samples, two populations can be seen within the viable cell gate, one with low FVS510 staining and the other just below the viability threshold and with a high side scatter profile. The correction in this case involves resetting the viability gate and fitting the singlets gate to the more restricted viable population. Light scatter and fluorescence signal values were recorded for each single event and used for downstream model development and validation.

Based on our earlier slide-based assay results, we anticipated that smoking history (or correlated factors like age) and TCPP signal density (as opposed to fluorescence intensity itself) would be important predictors. We therefore divided the fluorescence signals of all channels by $\log_{10}$ FSC-A or $\log_{10}$ SSC-A and partitioned the resulting density distribution into 3 regions (R1=about <0.25, R2=about 0.25-0.6, R3=about >0.6, FIGS. 6A-6D). Two such density signals proved informative for the classifier: TCPP/$\log_{10}$ SSC-A (FIG. 6A, region 3 [R3]) and FVS510-A/$\log_{10}$ FSC-A (FIG. 6C, region 2 [R2]). The predictive value of TCPP/$\log_{10}$ SSC-A signal density was not imposed upon the stepwise regression but emerged spontaneously. The fact that FVS510-A signal density was also found to be informative is interesting and may be related to the fact that apoptotic cells can take up this dye at intermediate levels.

FIG. 6A illustrates a histogram of viable, single cells stained with TCPP showing R1, R2 and R3 sections with R3 section identified by rectangle solid box. Region R3 (shaded) represents viable singlets with high TCPP signal relative to side scatter (log 10-transformed). FIG. 6B illustrates a histogram with TCPP/$\log_{10}$ SSC on x-axis and Density on y-axis displaying cells without TCPP (unstained control) and region R3 is without events. FIG. 6C illustrates a histogram of viable, single cells with FVS510/$\log_{10}$ FSC on x-axis and Density on y-axis displaying cells negative for FVS510 (R1) or stained with low levels of FVS510 (R2; solid rectangle shaded box). Cells in R1 and R2 are all below the FVS510 positivity cutoff but the cells in R2 nevertheless display a relatively higher FVS510 signal relative to forward scatter (log 10-transformed) as compared to unstained control sample in FIG. 6D. FIG. 6D illustrates a histogram with FVS510/$\log_{10}$ FSC on x-axis and Density on y-axis displaying cells that were not stained with FVS510 (unstained control).

Combinations of cell lineage markers can identify subpopulations that single cell lineage markers alone may not capture. Careful examination of patient sputum samples by FCM revealed complex patterns of cell lineage marker expression in blood and epithelial tubes but is was not obvious what the information revealed as to lung health.

FIG. 6E illustrates a dot plot with CD206 on x-axis and CD66b/CD3/CD19 on the y-axis. The solid shaded box on the low quadrant of CD206 identifies non-macrophages while the solid box on the mid to high quadrant of CD206 identifies lung-macrophages. Anti-CD206 is a macrophage cell marker which is specific for macrophage populations that reside in the lung tissue and are not found in the blood circulation. Anti-CD66b is a granulocyte cell marker, anti-CD3 is a T-cell marker and anti-CD19 is a B-cell marker. FIG. 6F illustrates a dot plot with CD206 on x-axis and CD66b/CD3/CD19 on the y-axis and the solid shaded box on the low quadrant of CD206 identifies the absence of non-macrophages while the solid box on the mid to high quadrant of cD206 identifies the absence of lung-macrophages from control sample. FIG. 6E illustrates the tan-shaded area which contains non-macrophage ($CD206^{low}$) leucocytes ($CD66b/CD3/CD19^{mid}$). The area shaded ($CD206^{mid/high}$ $CD66b/CD3/CD19^{low-mid}$) contains lung macrophages used as a marker for the sample to be considered to adequately sample the lung environment. Compare to unstained control sample in FIG. 6F which labels of quadrants apply also to FIG. 6E. All panels are from the same illustrative sample.

Analysis of pairwise cell markers by partitioning fluorescence based on signal distribution in blood (FIGS. 6E-6F) and epithelial tubes (data not shown) were analyzed. Signal intensity on the logical scale was quantized into low (<1.5), low-mid (1.5-2.5), mid (2.5-3), and high (>3) windows. Events per 10,000 were tabulated for each area of the resulting 4×4 grid of CD206 vs CD3/CD19/CD66b (blood tube) or EpCAM vs panCK (epithelial tube where data not shown). An area in the blood signal intensity grid was found to be informative for the predictive classifier lung assay model (tan-shaded rectangle; low for CD206 and mid-level for CD3/CD19/CD66b, FIG. 6E). This population may indicate the presence of immune or inflammatory processes in the lung.

Development of the automated processing of flow cytometer data features of sputum samples acquired with LSRII flow cytometer according to one embodiment of the present invention provides for one or more set-up and/or quality control steps prior to the automated analysis of the patient tubes/samples as follows:

For each sample tube, remove outlier events using for example time vs fluorescence channels for example using [flowCut]

Compensation tubes are used to automatically derive spillover matrix for example using [flowStats];

It should be noted that for the Navios flow cytometer the automated process is started with the operator spill matrix from the unstained sample and the alignment is checked of medians in "off" channels (i.e., non-FITC channels if FITC is being compensated), tweaking as necessary based on the expectation that the means of positive and negative populations (as defined in the channel being compensated, e.g., FITC) should be aligned in the off channels (e.g., non-FITC channels).

Fluorescence signals are compensated and transformed to logical scale for example using [flowWorkspace];

It should be noted that for automated processing on the Navious, transform 20-bit signal (0 to 1,048,575) to 6 decades to roughly match LSRII ranges.

Automatically find about smallest NIST bead peak to set lower FSC-A threshold (low) to exclude bulk of debris for example using [openCyto]. For example, when using LSRII flow cytometer a window from $10^4$ (low) to $5 \times 10^4$ (high) is the region of interest;

It should be noted that for Navios: look in window from $10^4$ (low) to $10^5$ (high)

Further automated analysis of patient tubes/samples according to one embodiment of the present invention provides for:

Patient Tubes:

Events within the rectangular size gate are kept for further analysis, "BSE" (FSC-A: low-$2.5 \times 10^5$, SSC-A: 0-$2.5 \times 10^5$). [flowWorkspace]

For Navios: "BSE" (FSC-A: low-$10^6$, SSC-A: $5 \times 10^3$-$10^6$)

Apply a secondary "NON-DEBRIS" gate to the kept BSE population to exclude occasional unusual cell population high in FSC-H (>$2 \times 10^5$) and intermediate/high in SSC-H (>$1 \times 10^5$). [flowWorkspace];

For Navios: The equivalent to the LSRII NON-DEBRIS gate is a selection polygon "cleanSSC" defined on SSC-W vs SSC-A (lower left=50,50; upper left=50, $10^6$; lower right=200,50; upper right=$10^3$,$10^6$), rather than an exclusion gate on FSC-H vs SSC-H. The choice of channel depends on how well the debris can be visualized and excluded. This gate is applied at the end of the Navios processing on the retained viable singlets.

A subset of cells are utilized most likely to contain the live singlets population of interest (dummy gating set) to set viability gate coordinates. This helps reduce artifacts and distortions from contaminating squamous epithelial cells (SECs) and other dead cells.

For LSRII:

Set an automatic flowClust gate on NON-DEBRIS events using FSC-H vs SSC-H, "h×h", to exclude most of the contaminating SECs, restricting both channels to <$1 \times 10^5$ and using a 0.99 quantile cutoff. [openCyto, flowClust]

In some samples, if <10% of events are retained in h×h (low.viable=true), relax channel restrictions to $1.5 \times 10^5$ and quantile to 0.9.

An automatic singletGate "singlets" is set on h×h using FSC-A vs FSC-W channels and the "wider_gate=TRUE" setting. [openCyto, flowStats];

The upper right FSC-A coordinate is forced to the same value as the lower right one to avoid cases were persisting SECs skew the gate downwards. [flowWorkspace];

Set an automatic tailGate "VIABLE" on singlets using the FVS510-A channel, restricting to min=2, max=3 (min and max on logical scale), tolerance=0.1. [openCyto]

If low.viable=true case, first restrict singlets events to SSC-A<$5 \times 10^4$ and set smoothing parameter adjust=1; [flowCore]

otherwise, first restrict singlets events to FSC-A<$5 \times 10^4$ and set smoothing parameter adjust=1.2. [flowCore]

For Navios it should be noted that BV510-A signal is resolved better on the Navios than the LSRII resulting in somewhat different processing steps.

Set a rectangular gate on NON-DEBRIS events using BV510-A [0,3.5] vs SSC-W [50,200], "quickLive", to exclude most of the contaminating SECs.

Set an automatic singletGate "SINGLETS" on quickLive using FSC-A vs FSC-W channels and the "wider_gate=FALSE" setting.

Force the rightmost FSC-A coordinate to the BSE limit ($10^6$) and raise the maximum FSC-W limit to $2 \times 10^5$ to counteract cases were persisting SECs skew the gate downwards.

Set an automatic tailGate "VIABLE" on BSE using the FVS510-A channel, with arguments (side="left", max=3.5, tolerance=0.1).

It should be noted that the BV510-A cut off found for most samples is reasonable and near 4 but occasional heuristic "tweaking" is needed to correct for cases where the signal doesn't fall into two well-resolved populations. Tweaking is done to the VIABLE tailGate parameters.

It should be noted that the isotype sample has no TCPP which results in higher BV510-A signal Tweaking thresholds:

reason.cut=4, high.cut=5 (patient samples excluding isotype)

reason.cut=4.5, high.cut=5.5 (isotype)

If (#events with BV510-A>VIABLE cut off)>1.5 times (#events with BV510-A>reason.cut): VIABLE cut off too low so need to move to the right.

Set tailGate "min" argument to larger of reason.cut and average BV510-A expression, increasing by a further 0.5 if >25% of events>reason.cut are also >high.cut.

Ff (#events with BV510-A>VIABLE cut off)>2 times (#events with BV510-A>reason.cut): set tailGate tolerance=0.2 and adjust=0.5.

If (#events with BV510-A>VIABLE cut off) times 1.5< (#events with BV510-A>reason.cut): VIABLE cut off too high so need to move to the left.

Set tailGate "max" argument to smaller of high.cut and average BV510-A expression, increasing by a further 0.5 if >25% of events have BV510-A>high.cut.

Set tailGate "min" argument to 3.5, increasing by a further 0.5 if >25% of events have BV510-A>high.cut.

If (#events with BV510-A>VIABLE cut off) times 2.25< (#events with BV510-A>reason.cut): over-shifted to the left so increase tailGate "min" a further 0.5 and set adjust=2.

Make a temporary gating set with events in both BSE and SINGLETS gates and recalculate the automatic tailGate VIABLE using the tweaked arguments.

Apply VIABLE gate determined from the dummy gating set to the full gating set NON-DEBRIS events. [flowWorkspace]

An automatic singletGate, "SINGLETS", set on VIABLE events gives good results in most cases but some samples still contain confounding events at this point.

SEC contamination can map close to larger viable cells which can result in a lower left coordinate<0 or a lower right coordinate<the upper left one. In both cases, restrict VIABLE to SSC-A<5×10$^4$ before setting an automatic singletGate with "wider_gate=FALSE". [openCyto, flowStats]

In all cases, force the upper right FSC-A coordinate to the same value as the lower right one to avoid cases were persisting SECs skew the gate downwards. [flowWorkspace]

Apply SINGLETS gate to VIABLE events. [flowWorkspace]

When there are relatively few viable cells, the proportion of events retained in the SINGLETS gate in the gap between FVS510-A>2.5 (logical scale) and the viability cutoff can be substantial.

If "gap" population is >10% of SINGLETS, force FVS501-A<2.5 as viable cutoff.

Remove "VIABLE" from full gating set. [flowWorkspace]

Set "VIABLE" rectangleGate on NON-DEBRIS with FVS510-A<2.5. [flowWorkspace]

Recalculate automatic singletGate "SINGLETS" as above. [openCyto, flowStats, flowWorkspace]

Apply SINGLETS gate to full gating set VIABLE events. [flowWorkspace]

It should be noted, for Navios, intermediate gates are rdemove from patient samples, retaining only BSE.

a VIABLE gate is applied to BSE.

a SINGLETS gate is applied to VIABLE.

CleanSSC gate is applied to SINGLETS.

The full matrix of event retained by SINGLETS (LSRII) or cleanSSC (Navios) is written out for gate for each patient tube. These values along with patient metadata are the inputs to the Cancer/Non-Cancer classifier.

It should be noted that retained events are quantized to generate model variable values. Due to differences in LSRII and Navios detector output values, ranges are not identical. See below 5.5 Grid Settings.

Analysis Steps for the LSRII Flow Cytometer [R Package(s)] with Embedded Navios Details are proved according to one embodiment of the present invention:

Note 1: Steps for the Navios EX flow cytometer are essentially the same but adjusted for the different file format (i.e., LMD files for the Navios EX instead of FCS files for the LSRII) and detector sensitivity and dynamic range (LSRII=18 bit, Navios=20 bit).

1.1: LSRII utilizes 2 configurations files. One is to match filenames with fluorescence controls for compensation (matchfile.csv). The other is to identify patient tubes (possibly multiple tubes) and flow cytometer channel names (samplematch.csv). See below in 5. Additional Materials "Configuration Files for LSRII" (5.1 and 5.2) for examples.

1.2: Rather than using configuration files, a controlled tube-naming convention was introduced for Navios sample collection. See below in 5.3 Controlled Tube Naming Protocol for Navios.

1.3 Fluorescence channel names and order in the flow cytometer files are different but mappable between LSRII and Navios. See 5.4 Channel Equivalence and Detector Maxima below.

Note 2: Gate names are indicated in BOLD UPPERCASE.

Note 3: Temporary gate names are indicated in bold lowercase.

Note 4: Calculated threshold values are in bold italics.

Note 5: Main package(s) used for current step are indicated by [square brackets].

Note 6: Some heuristic adjustments were needed to handle the wide range of sample composition and viability.

An embodiment of a sample Processing Pipeline according to one embodiment of the present invention is provided below:

Analysis Tubes:

NIST beads

Compensation tubes (one per fluorescence channel)

Patient single-cell suspension (4tubes):

Unstained as control for PE-anti-CD45, and TCPP

Isotype control stained with FVS510 (viability), PE-anti-CD45, PE-CF594 isotype, A488 isotype, FITC isotype.

"Blood" stained with TCPP, FVS510, PE-anti-CD45, PE-CF594-anti-CD206, A488-anti-CD3, FITC-anti-CD66b, A488-anti-CD19 (note: A488 and FITC read out on the same channel resulting in a combined CD66b/CD19/CD3 signal).

"Epithelial" stained with TCPP, FVS510, PE-anti-CD45, PE-CF594-anti-EpCAM (epithelial cell adhesion molecule), A488-anti-PanCK (pan-cytokeratin)

5.5 Grid Settings

| Fluorescence | LSRII CD206 | LSRII CD66b/CD3/CD19 | Navios CD206 | Navios CD66b/CD3/CD19 |
|---|---|---|---|---|
| low | <1.5 | <1.5 | <2.5 | <2.5 |
| lowmid | >=1.5, <2.5 | >=1.5, <2.5 | >=2.5, <3.5 | >=2.5, <3.5 |
| mid | >=2.5, <3 | >=2.5, <3 | >=3.5, <4.5 | >=3.5, <4 |
| high | >=3 | >=3 | >=4.5 | >=4 |
| Per cell signal density (Fluorescence/size) | FVS510/ $\log_{10}$(FSC) | TCPP/ $\log_{10}$(SSC) | FVS510/ $\log_{10}$(FSC) | FVS510/ $\log_{10}$(SSC) |
| low[R1] | <0.3 | <0.3 | <0.6 | <0.9 |
| mid[R2] | >=0.3, <0.6 | >=0.3, <0.6 | >=0.6, <0.8 | >=0.9, <1.2 |
| high[R3] | >=0.6 | >=0.6 | >=0.8 | >=1.2 |

5. Additional Materials as Examples of Data Input to System and Method 5.1 Sample matchfile.csv Configuration File for LSRII
  filename,channel
  Specimen_001_BL-18-148 Unstained_011.fcs,unstained
  Specimen_001_A549 FVS510_007.fcs,BV510-A
  Specimen_001_PE comp beads_003.fcs,PE-A
  Specimen_001_PE-TxRed comp beads_005.fcs,PE-Texas Red-A
  Specimen_001_FITC comp beads_004.fcs,FITC-A
  Specimen_001_A549 TCPP_008.fcs,APC-A 5.2 Sample samplematch.csv Configuration File for LSRII
  #multiple collection tubes separated by //
  variable,detail
  blood,s_BL-19-151_Blood_016.fcs//s_BL-19-151_Blood-tube2_017.fcs
  epithelial,s_BL-19-151_Epithelial_018.fcs
  isotype,s_BL-19-151_Isotype_015.fcs
  stub,BL-19-151
  fitc_name,FITC-A
  nist,s_NIST_001.fcs 5.3 Controlled Tube Naming Protocol for Navios
  01_NIST
  03_FITC
  04_PE
  05_PECF594 (Texas Red)
  06_APCpos (needs to be combined with tube 13 pre-compensation)
  07_FVS510
  08_Accession #_Unstained (patient sample)
  09_Accession #_Isotype (patient sample)
  10_Accession #_Blood (patient sample)
  11_Accession #_Epithelial (patient sample)
  13_APCneg (needs to be combined with tube 6 pre-compensation)

5.4 Channel Equivalence and Detector Maxima examples for different instruments used for transforming the data. Are illustrated in the below grid.

| LSRII Channel Name* | Maximum | Navios Channel Name* | Maximum |
|---|---|---|---|
| FSC-H | 262144 | FS-H | 262144 |
| FSC-A | 262144 | FS-A | 1048576 |
| FSC-W | 262144 | FS-W | 1024 |
| SSC-H | 262144 | SS-H | 262144 |
| SSC-A | 262144 | SS-A | 1048576 |
| SSC-W | 262144 | SS-W | 1024 |
| FITC-A | 262144 | FL1-A | 1048576 |
| PE-A | 262144 | FL2-A | 1048576 |
| PE Texas Red-A | 262144 | FL3-A | 1048576 |
| APC-A | 262144 | FL6-A | 1048576 |
| BV510-A | 262144 | FL10-A | 1048576 |
| Time | 262144 | TIME | 1048576 |

*As found in FCS (LSRII) or LMD (Navios) metadata.

A reduced list of cell lineage markers as potential predictors were identified to those that were most promising, and interrogated pairwise interactions between them for classifiers that would provide high sensitivity and high selectivity in an assay for identifying cells that were likely cancer and not likely cancer. It was unexpectedly discovered that adding a negative value proportional to "age×number of events in FVS510-A/$\log_{10}$ FSC-A R2" improved the classifier's performance. One interpretation of this interaction term is that it serves to moderate a possibly age-related accumulation of stressed cells in the high-risk patient group as a consequence of smoking or health history.

Figure 7:
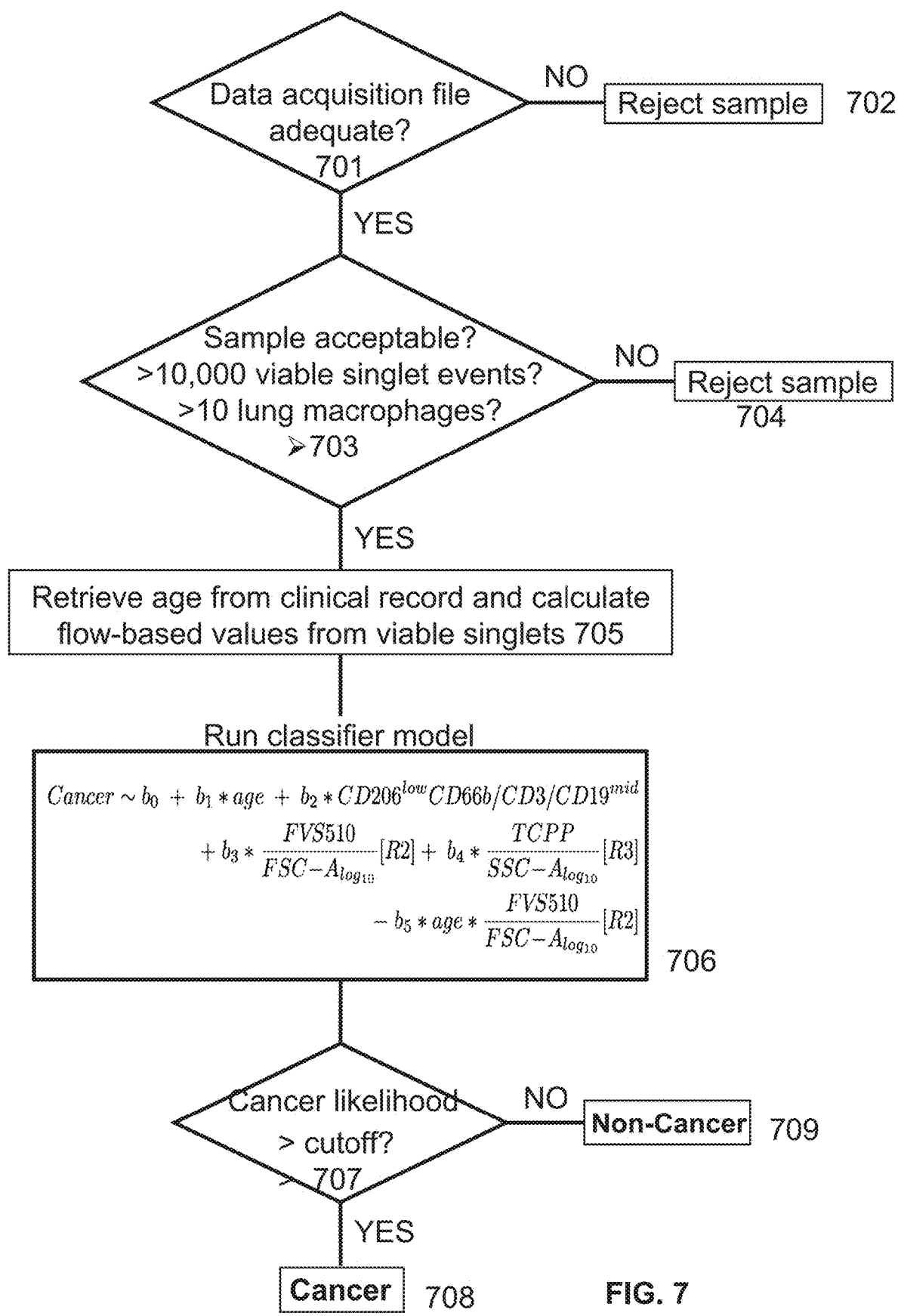
FIG. 7 illustrates a flow chart of the data analysis of a sputum-based lung assay according to one embodiment of the present invention.

Having developed the two stages of the Lung assay, the full pipeline was assembled, including quality control steps, determination of predictive variable values, and classification of samples (FIG. 7).

Referring now to FIG. 7, lung sputum data processing pipeline is illustrated according to one embodiment of the present invention. The schematic represents the following main elements: Quality Control (QC) measures 701 and 703 are performed on the data and instrument. Data acquisition file is reviewed for adequacy. Sputum samples having about 10,000 viable singlet events and about 10 or more lung macrophages in the sample are determined to be adequate. Retrieval of the subject specific data such as the information in Table 1 is obtained and combined with sputum sample characteristics obtained from FCM acquired population 705 from the FCM. The classifier 706 is the equation of a line including coefficients $b_0$-$b_5$ determined by fitting the 706 classifier model to a specific set of samples used to build the classifier. Classifier 706 is applied to new samples to determine a value for cancer likelihood based upon a cut off value 707. The classifier model is applied to the FCM acquired populations from the sputum sample and subject specific data input to the classifier to determine whether the sample is likely to be cancer 708 or not 709 (bottom diamond). Coefficients $b_0$-$b_5$ derived from fitting the classifier 706 to specific set of samples used to build the classifier are as follows:

$b_0$: 53.515414
$b_1$: 0.701153
$b_2$: 0.001545
$b_3$: 58.071495
$b_4$: 4.258709
$b_5$: 0.784982

One of ordinary skill in the art would understand that fitting classifier 706 to a different set of sample values will change the values of the coefficients but will not change the model itself.

In one embodiment of the present invention, data acquisition adequacy 701 and sample acceptability assessment 703 begins by ensuring that the data file for each collection tube is readable and that its encoded data matrix is complete. The Time signature is used to examine fluorescence channels in each tube and to remove anomalies in the flow rate arising from bubbles or clogs during sample acquisition. Fluorescence compensation tubes are then used to derive the compensation matrix de novo (as opposed to using the compensation matrix encoded in the sample file metadata). Fluorescence signal is compensated and transformed to the logical scale to produce the sample data matrix used by the automated FCM gating to isolate viable singlet events. In order to have confidence in the downstream numerical analysis, given potentially small numbers of events in some analysis windows, samples containing a threshold number of singlets were analyzed, for example at least 10,000 viable singlets. A threshold was set at about at least 10 cells be present in the shaded area of FIG. 6E in which we find lung macrophages ($CD206^{mid\&high}CD3/CD19/CD66b^{low-mid}$) to confirm that the sputum sample originated in the lung.

A further step in the assay pipeline of FIG. 7 is to supply age in years and flow-based values from viable singlets to the classifier model. In one embodiment of the present invention a classifier for determining the likelihood of having cancer is determined with 4 variables: i) age, ii) number of events per 10,000 viable singlets (per 10K) with TCPP/$\log_{10}$ SSC-A in Region 3 (FIG. 6A, R3), iii) number of events per 10K with FVS510-A/$\log_{10}$ FSC-A in Region 2 (FIG. 6B, R2), and iv) number of events per 10K in the $CD206^{low}CD3/CD19CD66b^{mid}$ sector (FIG. 6C, shaded box). In addition, the classifier contains a negative term for the interaction between age and the FVS510 density variable and an "intercept" term ($b_0$) that serves to avoid forcing our multifactorial model to zero if all the variables are set to zero but is not directly interpretable as a biologically meaningful component of the classifier. The values of the coefficients ($b_1$, $b_2$, $b_3$, $b_4$, and $b_5$) depend on the training set used for model fitting and provide weights for the variables. We did not normalize the data provided to the model in order to make interpretation of the model easier. For example, the model formula tells us that increasing the number of events with high TCPP density increases the likelihood of cancer, consistent with our previous results.

The determination step of the FIG. 7 pipeline is to make the cancer/non-cancer assignment. The model returns a value in the range of [0, 1]. Whether a given sample is classified as cancer depends on having the model return a value greater than a predetermined cut off. If the value is less than or equal to the cut off, the sample is classified as non-cancer. A rational cut off can be selected by stepping through cut off values between 0 and 1 and measuring the true positive and false positive calls as compared to the known group category at each step.

The development of the GLM classifier according to one embodiment of the present invention is described below and in a further iteration at FIG. 11. Input to the process is illustrated by output of FCM step (see for example 1101-1102 of FIG. 11).

Figure 11:
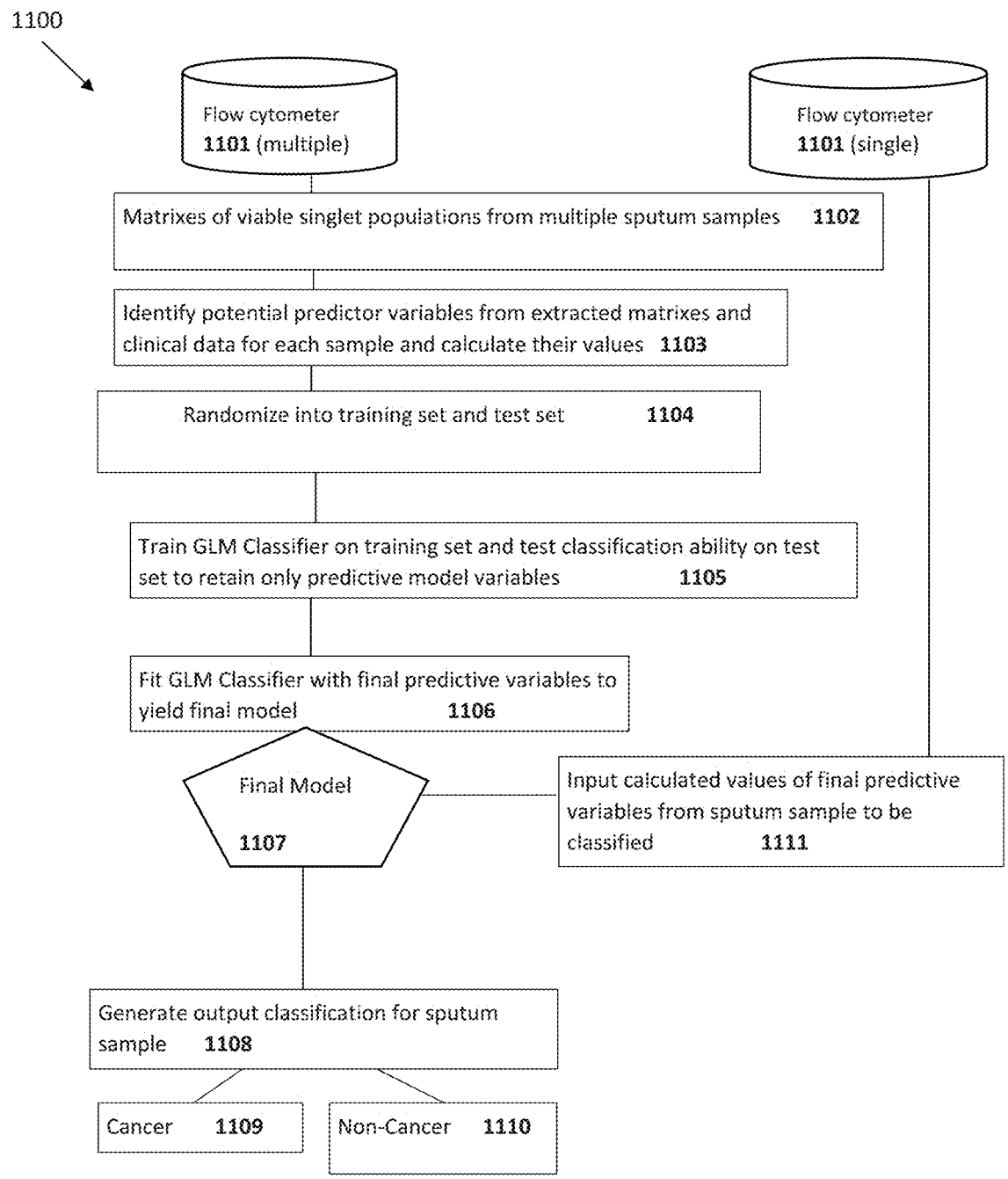
FIG. 11 illustrates an embodiment of the classifier development according to one embodiment of the present invention.

Evaluate Combinations of Potential Predictive Factors (1103-1105 of FIG. 11).

1) Combinations of potential predictive factors were evaluated (see for example 1103 of FIG. 11) to develop a classifier using generalized linear models (GLM) for semi supervised machine learning as follows:
   1.1. clinical parameters available for all samples
   1.2. quantized measurements using equally spaced or heuristically positioned breaks (3×3 and 4×4 grids per channel tested) from patient blood and epithelial samples (light and fluorescence), individually and in pairwise combinations
   1.3. quantized measurements as in #2 above minus background counts
   1.4. quantized fluorescence/log 10(light scatter)
   1.5. frequency of specific subpopulations identified by prior manual analysis
2) Iterative step-forward and step-backward parameter inclusion in GLMs using distinct training and testing groups (roughly 2/3 training, 1/3 testing, randomly selected and non-overlapping (see for example 1104-1105 of FIG. 11);
3) Evaluate GLMs based on the Akaike information criterion (AIC) which estimates prediction error and provides a comparator of model quality; (see for example 1105 of FIG. 11)
4) Keep parameters retained repeatedly in different iterations of model testing with different combinations of potential predictive variables tested individually and in combinations to detect potential interactions (see for example 1104-1105 of FIG. 11);
5) Control for over-fitting of the final model by repeated random sampling (n=10) of training/testing sets to verify predictive robustness independent of specific samples used to train the model; (see for example 1106 of FIG. 11); and
6) Validate processing pipeline and classifier predictions on samples not used in model building and testing. (see for example 1107-1110 of FIG. 11).

Once the classifier is developed it is applied to new samples not previously analyzed for which a classification of cancer/non-cancer is unknown (see 1101 and 1111 of FIG. 11).

Figure 8A:
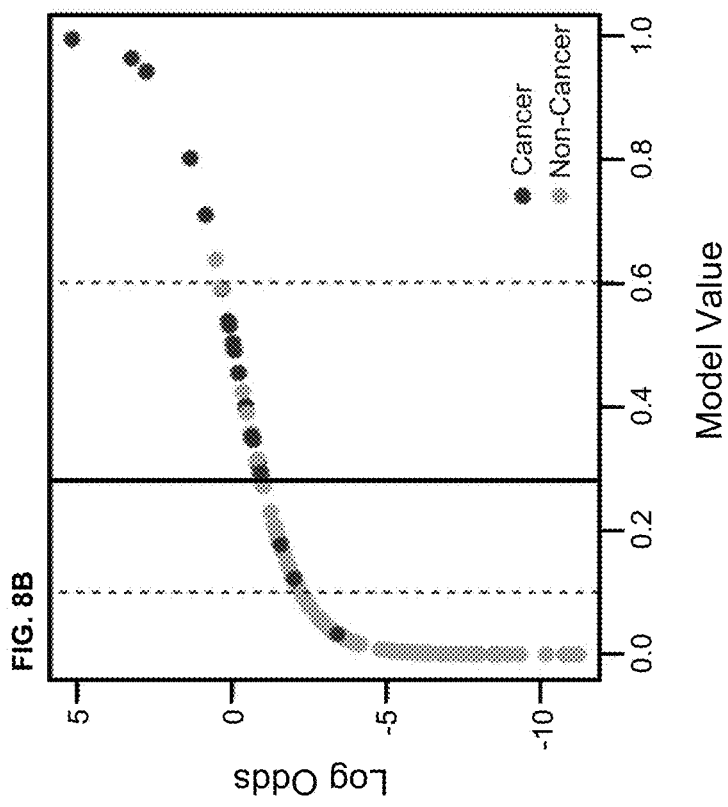
FIG. 8A illustrates a receiver operator (ROC) graph of false positive vs true positive rates calculated as the model response threshold was varied.
Figure 8B:
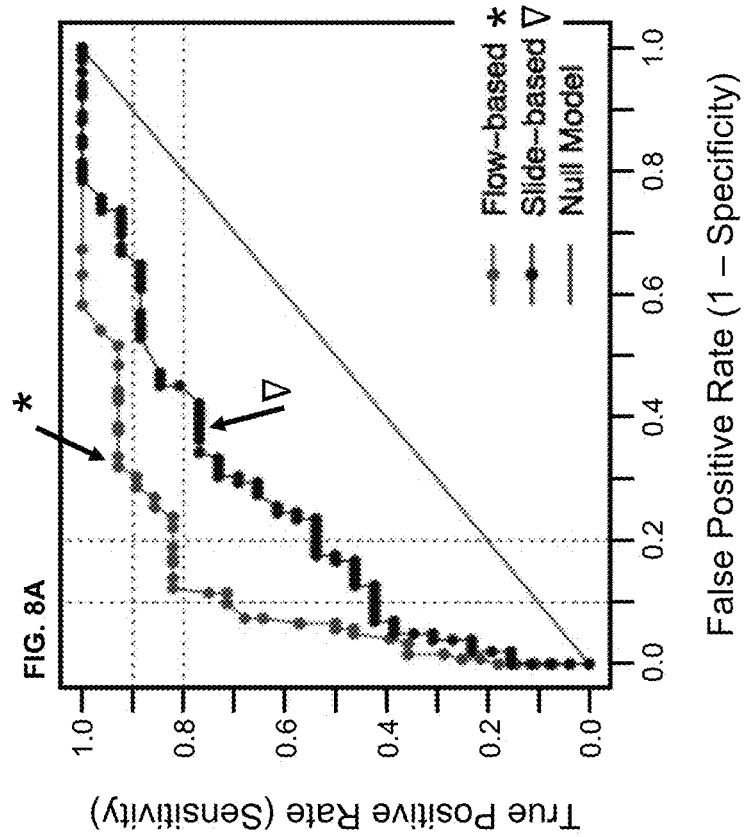
FIG. 8B is a graph of model value (likelihood of cancer) based on the ROC curve in FIG. 8A.

Referring now to FIG. 8A shows the result of this process as a receiver operating characteristic (ROC) curve, with an AUC of 0.89. The assay achieved its best performance at discriminating cancer from non-cancer at a threshold of 0.28 (FIG. 8B, solid vertical line).

Referring now to FIG. 8A, a receptor operating characteristic (ROC) curve showing false positive vs true positive rates calculated as the model response threshold was varied line indicated with star is illustrated. For comparison, the ROC curve of the previous version of the slide-based lung assay is shown with the upside down triangle curve. Dashed lines indicate 80% and 90% sensitivity and specificity (1—False Positive Rate). FIG. 8B illustrates a model based on the ROC curve in FIG. 8A. A model value (likelihood of cancer) threshold was set at 0.28 (solid vertical line), corresponding to a sensitivity of 82.1% and sensitivity of 87.7%. The dashed lines indicate levels below which a prediction of cancer is very unlikely (leftmost dashed line) or very likely (rightmost dashed line). Dark circles represent cancer and light circles represent high risk. CyPath Lung performance on LSRII samples is shown.

In one embodiment of the present invention, automated analysis of the samples with flow cytometry combined with machine learning resulted in a predictive model that is sensitive (82%) and specific (88%) and is robust to differences in sample handling and disease stage. Importantly, the test was 92% sensitive and 87% specific in difficult to manage cases without nodules or with nodules≤20 mm in diameter.

Figure 9B:
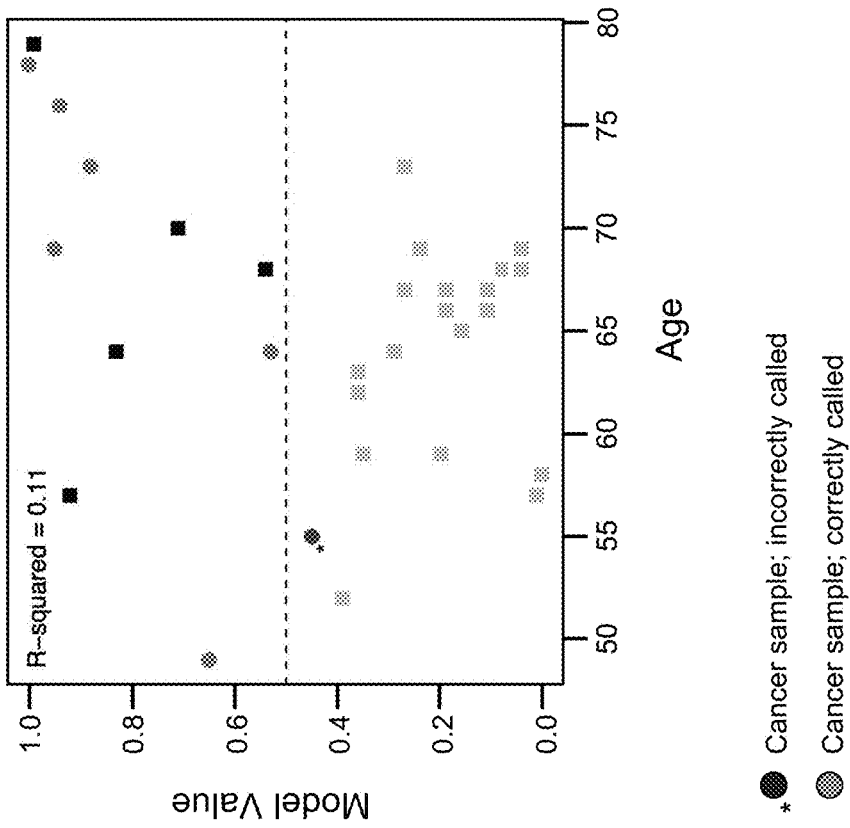
FIGS. 9A-9B illustrate correlation graphs of age on x-axis vs Model Value on y-axis when the samples are analyzed on an LSRII flow cytometer or NaviosEX cytometer respectively.
Figure 9A:
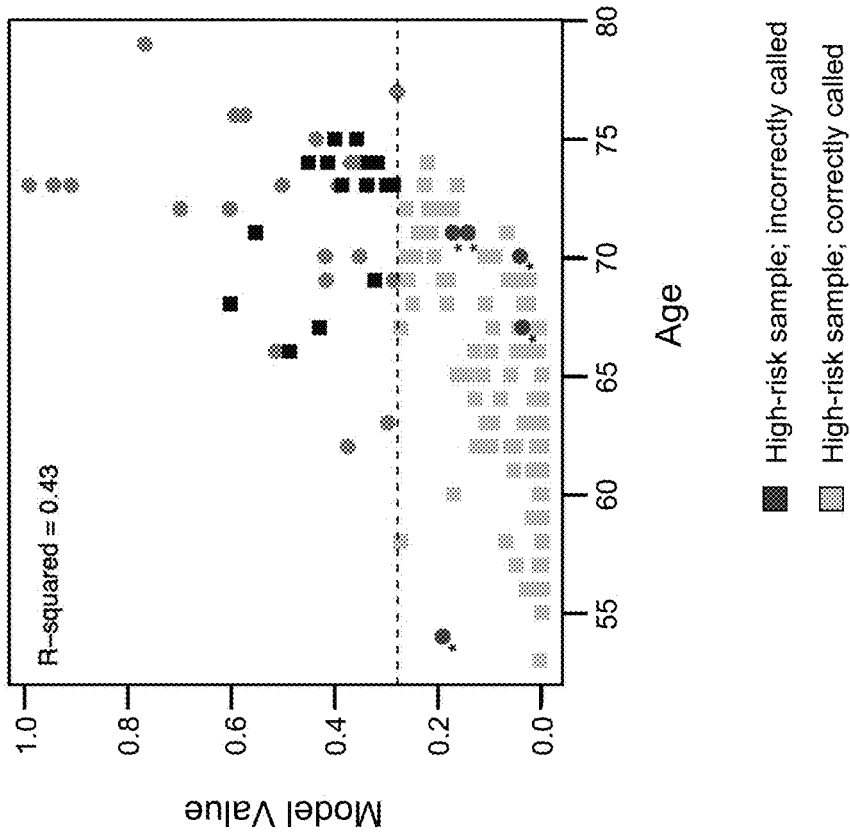

Referring now to FIG. 9A-B correlation graphs are illustrates of age on x-axis vs Model Value on y-axis when the samples are analyzed on an LSRII flow cytometer or NaviosEX cytometer respectively.

Figure 10:
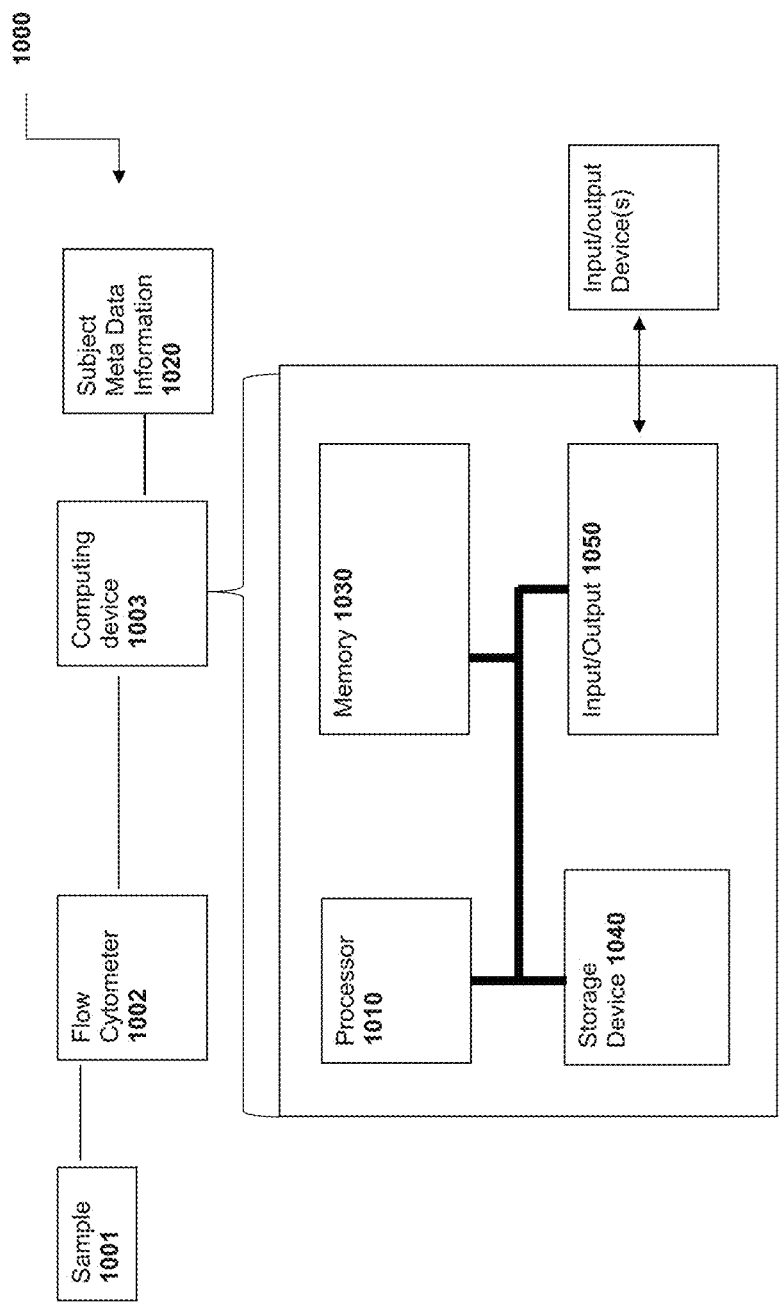
FIG. 10 illustrates an exemplary system according to one embodiment of a system as disclosed herein.

Referring now to FIG. 10, an exemplary system and method 1000 is illustrated for receiving input from a flow cytometer 1002 based upon a sample 1001 analyzed by the flow cytometer and subject meta data information 1020. Computer-implemented device 1003 includes a processor 1010 (e.g., processing circuitry) that is operable to execute program instructions or software, causing the computer to perform various methods or tasks, such as performing the techniques for generating and/or using analytical models for a classifier model as described herein. Processor 1010 is coupled via bus (not shown) to a memory 1030, which is used to store information such as program instructions and/or other data while the computer is in operation. A storage device 1040, such as a hard disk drive nonvolatile memory, or other non-transient storage device stores information such as program instructions, data files of the multidimensional data and the reduced data set, and other information. The computer also includes various input-output elements 1050, including parallel or serial ports, USB, Firewire or IEEE 1394, Ethernet, and other such ports to connect the computer to external devices such a printer, video camera, display device, medical imaging device, surveillance equipment or the like. Other input-output elements include wireless communication interfaces such as Bluetooth, Wi-Fi, and cellular data networks. The computer itself may be a traditional personal computer, a rack-mount or business computer or server, or any other type of computerized system. The computer, in a further example, may include fewer than all elements listed above, such as a thin client or mobile device having only some of the shown elements. In another example, the computer is distributed among multiple computer systems, such as a distributed server that has many computers working together to provide various functions.

Referring now to FIG. 11, an exemplary process flow chart 1100 used for semi-supervised machine learning of a GLM classifier of cancer/non-cancer state and subsequent classification of a biological sample such as a sputum is illustrated according to one embodiment of the present invention. Sputum samples treated for processing in a flow cytometer are provided to a flow cytometer for analysis as outlined herein 1100. Flow cytometer data 1101 from multiple sputum samples are processed with automated FCM to extract data matrixes of viable singlet populations from each sample 1102. The numeric values of potential predictor variables related to the collected flow cytometry data matrixes and associated clinical data are calculated for all samples 1103. The multiple samples are randomized into a training set and a test set 1104. A GLM classifier is constructed using the values of the potential predictors from the training set along with the known cancer/non-cancer status of the training set. The resulting classifier is evaluated on the test set for its ability to correctly classify the test set into cancer/non-cancer 1105. Step 1105 is repeated with different combinations of potential predictive variables, keeping only truly predictive variables from each iteration. A GLM classifier is fit with only retained predictive variables to yield final model 1106. A single sputum sample of unknown status to be classified is processed with automated FCM 1101 (single) to obtain numeric values of final predictive variables from sputum and subject meta data (for example age) 1111 and input to the Final Model to generate the classification value 1107. Based on the cut off for the classification value determined by ROC analysis, an output classification call is generated 1108 for the sputum sample of Cancer 1109 or Non-Cancer 1110.

According to one aspect of the present invention, the system and method correctly classifies study participants as cancer or non-cancer with high accuracy, including participants at different disease stages and with nodules smaller than 20 mm. This test thus has the potential to improve the process of early-stage lung cancer diagnosis.

Materials and Methods

Clinical Trial and Collection Sites

A minimal risk study was registered with ClinicalTrials.gov, reviewed and approved by the Sterling Institutional Review Board (Atlanta, GA), and conducted according to ethical principles of the Declaration of Helsinki (v 1996) and Good Clinical Practice guidelines. Sample collection was performed at five study centers: Atlantic Health System, NJ; Mt. Sinai Hospital, NY; Radiology Associates of Albuquerque, NM; South Texas Veterans Healthcare System; and Waterbury Pulmonary Associates, CT. Each site had received institutional approval to participate in the study. Each potential participant was presented an informed consent form and only those who signed it were enrolled.

Participant Information: Participants (males and females) were eligible for enrolment in one of two groups. The non-cancer group included participants (aged 50-80) who were either current smokers with a smoking history of at least 20 pack-years, or current non-smokers with a smoking history of at least 30 pack-years, who quit smoking within the past 15 years. The exceptions were two patients who had quit smoking 25 and 26 years ago. Most participants in the non-cancer group had received a LDCT result or other form of imaging that was not suspicious for cancer and they were advised to return for LDCT screening in 12 months. In a few cases, participants initially placed in the non-cancer group underwent a follow-up LDCT, PET/CT or a biopsy. These participants were followed until their health status was confirmed. If they were diagnosed with lung cancer, they were switched to the cancer group.

Each participant in the cancer group had been evaluated by a physician as highly suspect of having lung cancer based on medical history and LDCT or other imaging results. The diagnosis was confirmed by biopsy after a sputum sample was provided. The exception was a patient who had developed a new nodule of 24 mm and who was too fragile to undergo biopsy. If biopsy showed no cancer, the participant was switched to the non-cancer group. There was no limitation of age or smoking history for enrollment in the cancer group.

For each participant we collected the following demographic data: gender (male or female); age (years); ethnicity (Hispanic/Latino of non-Hispanic/Latino); and, race (American Indian/Alaska native; Asian; Black/African American; native Hawaiian/other Pacific islander; White; other). Data on smoking history was collected, as well as data on comorbidities (asthma, COPD, emphysema, chronic bronchitis) and previous cancer history. All participants needed to be willing to provide a primary care physician's contact information and agree to have medical information released if requested. Exclusion criteria included the presence of severe obstructive lung disease and inability to cough with sufficient exertion to produce a sputum sample, angina with minimal exertion, and pregnancy.

Exclusion criteria included the presence of severe obstructive lung disease and inability to cough with sufficient exertion to produce a sputum sample, angina with minimal exertion, and pregnancy.

Sputum samples: Sample donors were trained on how to use the acapella assist device (Smiths Medical, St. Paul, MN), repeated this procedure at home for three consecutive days and stored their specimen cup in a cool, dark place or in a refrigerator. Within one day after collection was completed, the sample was shipped overnight to the bioAffinity laboratory where further processing and FCM analysis took place by people blinded to the origin of the sample.

Sputum processing: Sputum was dissociated and labeled. For example, sputum samples were incubated with a mixture of 0.1% dithiothreitol and 0.5% N-acetyl-L-cysteine for 15 minutes at room temperature and neutralized with Hank's Balanced Salt Solution. Cells were then filtered through a 100-micron nylon strainer, washed and re-suspended in HBSS. Total cell yield was determined using the trypan blue exclusion method. Sputum was liquefied using pre-warmed 0.1% dithiothreitol (DTT) at a 1:4 ratio with sputum weight (w/v) and pre-warmed 0.5% N-acetyl-L-cysteine (NAC) at a ratio of 1:1 (w/v). The resulting cell suspension was filtered through 100 μm nylon cell strainers (Falcon, Corning Inc.) to eliminate larger debris while minimizing cell loss Cells were collected into 50 mL conical tubes, washed and centrifuged at 800×g for 10 minutes. The dissociated sputum pellets were combined into one 15 mL conical tube per sputum sample. The total cell yield and viability were determined with a Neubauer hemocytometer using the trypan blue exclusion method.

In one embodiment, a small aliquot of cells was set aside for use for controls while the majority was divided into two tubes for the main analysis. For example, both tubes were labeled with the Fixable Viability Stain 510 (FVS510) and CD45-PE. One tube, the so-called "blood tube" received CD66b-FITC, CD3-Alexa-Fluor-488, CD19-Alexa-Fluor-488 and CD206-PE-CF594. In the other tube, the "epithelial tube", cells were labeled with pan-cytokeratin-Alexa-Fluor-488 and EpCAM-PE-CF594. Cells were incubated for 35 minutes on ice. After washing with HBSS, cells were fixed and stored on ice until the next day, when a TCPP solution (20 μg/mL) was added ($3.3×10^6$ cells/ml; 1:1 v/v). After incubation for 1 hour on ice, cells were washed twice with cold HBSS and kept on ice until analysis.

In another embodiment cell labeling was performed by splitting the sample into at least two tubes: one tube including markers to interrogate the leukocyte (CD45+) cell compartment and one tube for the epithelial (CD45−) cell compartment. Each tube contained the anti-CD45 antibody, FVS510 (to exclude dead cells, including SECs), as well as the porphyrin TCPP (to identify cancer (associated) cells). For identifying leukocyte populations, an anti-CD206 antibody was added to label macrophages as well as a cocktail of antibodies to label granulocytes (anti-CD66b) and lymphocytes (anti-CD3 and anti-CD19). For epithelial cell recognition, we used anti-cytokeratin (panCK) and anti-EpCAM. No permeabilization step was performed for the cytokeratin labeling as the initial DTT and NAC treatment for sputum processing was sufficient for intracellular cytokeratin staining.

Dissociated sputum cells were incubated with the antibodies and FVS510 for 35 minutes. After one wash with cold HBSS, cells were fixed on ice for one hour with paraformaldehyde, after which cells were washed once again and stored on ice until TCPP labeling the next day. TCPP was added to the cells for one hour. After incubation, cells were washed twice with cold HBSS and then stored on ice until flow cytometric analysis. Throughout the labeling procedure until analysis, cells were kept on ice and protected from light. For more details about the reagents, see Table 7.

Flow cytometry: Sputum samples were acquired on a BD LSR II flow cytometer (BD Biosciences) equipped with 4 lasers (404 nm, 488 nm, 561 nm, and 633 nm) or on a Navios EX (Beckman Coulter Life Sciences) equipped with 3 lasers (405 nm, 488 nm and 638 nm). Post-collection data analysis was performed with FlowJo software (Tree Star, Inc. Ashland, OR).

Sample characteristics: Of the 171 patient LSRII samples collected, 150 were adequate for analysis by the full assay pipeline and consisted of 122 from high-risk patients without cancer and 28 patients with lung cancer (Table 1). A further 4 samples for which we did not have a definitive disease status were included in the pipeline development stage since the addition of unlabeled samples had been shown to be helpful in model building. In addition, 14 samples flagged as ineligible based on counts (see below in performing the lung assay pipeline) were also used in the model fitting stage to better capture the distribution of the underlying data and help make generalization of the model more robust to sample noise. Only 3 samples could not be used at all due to problems during acquisition.

TABLE 1

Patient Characteristics of LSRII Lung Assay Validation Samples

| Characteristic | | Non-Cancer, n = 122 | Cancer, n = 28 |
| --- | --- | --- | --- |
| Patient demographics | | | |
| Age—years | median (range) | 65 (53-75) | 73 (54-79) |
| Male | n (%) | 57 (46.7) | 21 (75.0) |
| Female | n (%) | 65 (53.3) | 7 (25.0) |
| Race | | | |
| White | n (%) | 110 (90.2) | 25 (89.3) |
| Non-white | n (%) | 12 (9.8) | 3 (10.7) |
| Ethnicity | | | |
| Hispanic | n (%) | 15 (12.3) | 8 (28.6) |
| Non-Hispanic | n (%) | 104 (85.2) | 18 (64.3) |
| Not available | n (%) | 3 (2.5) | 2 (7.1) |
| Smoking Status | | | |
| Never | n (%) | 0 (0) | 1 (3.6) |
| Former | n (%) | 69 (56.6) | 15 (53.6) |
| Pack years | mean (SD) | 56.1 (24.3) | 53.3 (36.3) |
| Current | n (%) | 53 (43.4) | 12 (42.9) |
| Pack years | mean (SD) | 55.2 (26.5) | 51.8 (14.1) |
| Comorbidities | | | |
| COPD | n (%) | 81 (66.4) | 13 (46.4) |
| Emphysema | n (%) | 23 (18.9) | 6 (21.4) |
| Asthma | n (%) | 16 (13.1) | 4 (14.3) |
| Bronchitis | n (%) | 7 (5.7) | 3 (10.7) |
| Cancer | n (%) | 17 (13.9) | 3 (10.7) | n = number of samples
SD = standard deviation

Traditionally, the presence of "numerous" macrophages in a sputum smear is indicative of a sample that originates from the lung. A quality control measure using the cell surface antigen CD206, which is specific for macrophage populations that reside in lung tissue and are not found in the blood circulation was utilized in a FCM lung assay according to one embodiment of the present invention. In one embodiment, sputum cells were stained with i) a cell marker specific for CD45, for example an antibody directed against CD45 (to identify leukocytes), ii) a cell marker specific for CD206, iii) a cell marker specific for CD66b, iv) a cell marker specific for CD3, and v) a cell marker specific for CD19. In one embodiment any combination of i)-v) can be combined for addition to the sputum sample, for example, a cocktail of antibodies made up of an anti-CD66b, an anti-CD3 and an anti-CD19 compound wherein for example the compound is an antibody or fragment thereof, to further separate the macrophages from other hematopoietic cells. In one embodiment, FVS510 was used as a viability dye to exclude the dead cells. A proportion of live sputum cells specifically express CD45 as evidenced by an anti-CD45PE signal. Cytospins of sorted CD45+ sputum cells confirmed their hematopoietic origin.

Further analysis of sputum samples analyzed with FCM reveal that sputum-derived leukocytes include distinct subpopulations of macrophages. Cells selected through a size exclusion gate and a live cell gate as well as a doublet discrimination gate illustrate a representative light scatter profile of unstained single, live sputum cells defining both the CD45+ and CD45− gates for sorting and further analysis. Cells that fell within the gates for live, single sputum cells and stained with the blood panel of antibodies were further analyzed.

Sputum derived leukocyte profiles of FVS510-CD45+ cells from a different sample stained with the blood panel of antibodies was further analyzed. Based upon the optical property of a cell lineage specific marker (fluorescence) and/or specific cell type (FFS/SSC), gates were used to identify lymphocytes/granulocytes (gate 1), as well as alveolar macrophages (gate 2) and interstitial macrophages (gate 3).

In this embodiment, fluorescence minus one (FMO) controls utilizing the same gates for leukocyte subpopulations as defined by blood panel of antibodies were analyzed. All FMO controls include the viability dye, CD45, and TCPP.

Sputum cells stained with the leukocyte antibody panel minus the CD66b, CD3, and CD19 antibodies were analyzed. Sputum cells stained with the leukocyte antibody panel minus the CD206 antibody was also analyzed. Wright-Giemsa-stained cytospins from the sorted CD45+ gate 2 and gate 3 populations were reviewed under microscope for visual identification. Scale bars indicate 20 μm in for gate 2 population of cells and 10 μm in gate 3 population of cells.

Cell types were confirmed by a pathologist. Cell size measurements of the sorted macrophage population in gate 2 and gate 3. For each population at least 100 cells were measured. Gate 2 average cell size is 16 um+/−standard deviation of about 3-5 um (**** p<0.0001).

A FCM profile of CD45+ sputum cells labeled with the anti-CD206 antibody and the cocktail of anti-CD66b, anti-CD3 and anti-CD19 antibodies was captured. An isotype control shows higher background staining than unstained or fluorescence minus-one (FMO) controls. Since the use of isotype control antibodies comes with its own set of problems, we used the FMO controls to identify the main subpopulations in sputum. By comparing the FMO control of the CD66b/CD3/CD19 cocktail with the stained sample that includes all antibodies, gate 1 can be set to identify the combined lymphocyte and granulocytes. Similarly, by comparing the FMO control for the CD206 antibody, two populations of CD206-positive cells can be identified.

After sorting cells from gates 2 and 3, cytological analysis revealed cell populations with a morphology consistent with that of macrophages. However, cells sorted from gate 3 were significantly smaller in size compared to cells sorted from gate 2. The sizes we have calculated for the alveolar and interstitial macrophage populations align with size ranges previously reported.

Alveolar macrophages are identified as strongly positive for CD206 and autofluorescent in the FITC channel gate 2, while interstitial lung macrophages are smaller in size and lower in CD206 expression gate 3.

The average background staining in the CD206 FMO control was 0.0023% (+/−SD 0.0021%) in both gates combined. A positivity threshold based on 2 standard deviations (SD) above the mean background staining would set it at 0.0065% for both gates combined, or 6 macrophages per 100,000 cells. Out of concern that a low threshold would not fall within the linear detection range for the PE-CF594 fluorochrome, we instead chose an arbitrary threshold of 0.05%, which included alveolar macrophages and interstitial macrophages. This threshold could not be solely based on interstitial macrophages. A 0.05% threshold was well within the linear range of detection of the flow cytometer and satisfies the criteria of "numerous macrophages" for an adequate sample as set by the Papanicolaou Society.

One hundred seventy-nine samples were analyzed for macrophage content. Fifteen samples were found to have inadequate macrophage numbers based on the criteria outlined above. However, six of these samples (3.4%) had fewer than 1000 CD45+ events for analysis, which based upon the limits set according to one embodiment of the present invention are too few cells for an adequate analysis. Five of the six samples had fewer than $1.5 \times 10^6$ total sputum cells prior to antibody staining. The remaining nine samples (5.0%) had more than 10,000 CD45+ cells (range 11648-463382) and all showed more than $1.7 \times 10^6$ sputum cells Moreover, only four of the 164 adequate samples showed less than $1.5 \times 10^6$ cells at the onset of the antibody staining process. Although these samples all included robust macrophage counts, three of the four showed less than 10,000 CD45+ cells (range 1327-2908). This data suggests that a sputum sample with less than $1.5 \times 10^6$ cells is too small for a reliable diagnostic flow cytometric analysis.

The calculated total number of sputum cells (excluding SECs) of individual samples prior to antibody labeling was calculated. All adequate samples (n=164) revealed >0.05% macrophages (alveolar and interstitial combined). Of the adequate samples, 18 samples where those having cell count that exceeded 50 million cells. The median cell count in the adequate samples was $14.6 \times 10^6$ cells. The inadequate samples (n=15) either showed no alveolar macrophages or the combined events in the alveolar and interstitial macrophage gates were <0.05%. The median cell count in the inadequate sample was $6.9 \times 10^6$ cells. A subset of the inadequate samples contained "too few cells" for a reliable profile (<1000 CD45+ events), while the remainder included enough cells, though did not fulfill the QC macrophage criteria to consider them adequate samples. The median cell count for too few cells is $1.1 \times 10^6$ cells.

One hundred sixty-four adequate sputum samples were further analyzed for differences between cancer and high-risk. This set included 32 samples obtained from individuals diagnosed with lung cancer and 132 from high-risk individuals who were cancer-free. The cancer group included 40.6% current smokers and the high-risk group 44.7%. There was no significant difference in pack years smoked between the groups. The average years that the former smokers had quit was also not significantly different. The proportion of females in the cancer group was smaller than in the high-risk group (21.9% versus 54.5%, respectively). The average age of the participants in the cancer group was 69.8 years compared to 64.8 years in the high-risk group (p<0.0002).

The first phase of the analysis looked at the proportion of CD45+ versus CD45-cells and the various subpopulations within each compartment, without the TCPP marker. We found that the proportion of CD45+ cells in sputum samples of cancer patients was significantly higher than in sputum from high-risk patients without the disease (49.64% vs 38.95%; p=0.0099). The different subpopulations of the CD45+ compartment were recognizable in all samples, however, the relative contribution of each population differed between samples and between groups. By comparing the relative sizes of each CD45+ subpopulation between cancer and high-risk samples, we found that cancer samples contained significantly more granulocytes/lymphocytes (gate 1 p=0.0378) and interstitial macrophages (gate 3 p=0.0031).

The CD45− compartment includes cells of epithelial origin, which was confirmed by the presence of goblet and ciliated epithelial cells when CD45− cells were sorted and their morphology visualized on cytospins. Using antibodies directed against EpCAM and cytokeratins allowed us to further delineate the CD45− cells by flow cytometry. The FMO controls show the low background of the respective antibodies used. The relative contribution of the various CD45− subpopulations varied from sample to sample and no significant differences were observed between the cancer and high-risk groups.

Live, single CD45− sputum cells, from a different sample were stained with an epithelial cell marker, for example PanCK and EpCAM (epithelial profile)/the epithelial antibody panel. Via FCM, fluorescence minus one (FMO) controls for the profile were obtained. FMO controls include viability dye, CD45, and TCPP were obtained. Sputum-derived epithelial profile of FVS510-CD45−cells stained with the isotype controls for the antibodies used were obtained (unstained sputum cells). FMO control FVS510-CD45− cells stained with EpCAM but without the panCK antibody profiles were obtained. FMO control FVS510-CD45− cells stained with panCK but without the EpCAM antibody were obtained.

The second phase of the FCM analysis looked at TCPP fluorescence. Single, live cells were separated into three subsets of cells based on TCPP staining intensity: TCPP-HIGH, TCPP-INTERMEDIATE(IM) and TCPP-LOW cells. The relative ratios of these subsets of cells did not differ between the high-risk and cancer groups. Each of these three subsets were then further interrogated for their content of CD45+ leukocyte populations and CD45− epithelial cell populations. The TCPP-HIGH cells, the TCPP-IM cells and the TCPP-LOW cells were further analyzed. TCPP-HIGH cells display a broad light scatter profile on the FSC vs SSC dot plot Ox/y axis.

The CD45+ compartment of TCPP-HIGH cells are enriched for alveolar macrophages (CD45+; CD206++ cells) while the CD45− compartment is enriched for EpCAM+; panCK+ double positive cells. The TCPP-IM cells represent most of the sputum cells and thus the profile of this subpopulation resembles that of the entire sample. The TCPP-LOW cells displayed relatively low light scatter properties compared to TCPP-HIGH cells and they are mostly CD45− without expression of the epithelial markers EpCAM or panCK.

Sputum cell populations with different TCPP fluorescence intensities were identified based upon gating of the different cell lineage markers via FCM. A dot plot analysis displaying TCPP versus FITC/Alexa488 fluorescence (i.e., CD66b/CD3/CD19 in the leukocyte tube and panCK in the non-leukocyte tube is used to define the TCPP-HIGH cut-off. A dot plot of TCPP versus PE-CF594 fluorescence can also be used for this purpose but the cells with the highest FI for TCPP are easier to identify in the former.

The TCPP-HIGH cut-off is taken from a gate positioned on a dot plot of sputum cells with y-axis TCPP and x-axis CD66b/CD3/CD19. The TCPP-LOW population is defined at the intersect when unstained sputum is overlaid with the TCPP-stained sample. The population with intermediate TCPP staining, TCPP-IM, is defined as the population between the TCPP-HIGH and the TCPP-LOW populations.

The unique properties of the TCPP-HIGH population showed several significant differences between the high-risk and cancer groups. First, the TCPP-HIGH cells from samples of the cancer group showed lower side scatter values than those from the high-risk group. Second, the CD45− compartment of the TCPP-HIGH population contained a higher percentage of EpCAM+panCK+ cells. Additionally, this double positive population from samples in the cancer group expressed higher levels of EpCAM, though not panCK, compared to the cells of the same quadrant that belonged to samples from the high-risk group.

Differences in sputum cell characteristics between cancer and high-risk sputum samples were identified with the TCPP-HIGH population in cancer samples displaying a smaller SSC than the TCPP-HIGH population in high-risk samples ( $p<0.01$). In cancer samples, the proportion of EpCAM+panCK+ cells in the CD45− fraction of the TCPP-HIGH subpopulation is larger than in the corresponding CD45− fraction in high-risk samples ( $p<0.01$). The mean fluorescence intensity (MFI) of EpCAM in TCPP-HIGH CD45-EpCAM+panCK+ cells is higher in cancer samples than in the corresponding cellular subset of high-risk samples (* $p<0.05$).

Upon further analysis of the cancer group, significantly higher EpCAM mean fluorescence intensity was observed in early-stage cancer samples (Stage I/II) compared to later stage cancer samples (Stage III/IV), (p=0.047). No significant differences based on cancer type (squamous cell carcinoma versus adenocarcinoma) nor any differences based on smoking history (current versus former smokers) were identified. Interestingly, when we separated high-risk smokers based on smoking history, the profiles of current high-risk smokers showed the presence of significantly more TCPP-HIGH;EpCAM+;panCK+ cells (p=0.0008) as well as macrophage populations, both alveolar (p=<0.0001) and interstitial (p=0.0141) compared to former smokers.

Current methodologies used for sputum analysis pose challenges that have limited their clinical use. Sputum cytology suffers from low sensitivity due to the high skill required for identifying subtle nuclear changes. The need to screen numerous slides makes it time consuming, which also hampers its clinical use. Imaging and molecular techniques can assess genetic changes in sputum-derived cells but screening methods based on nuclear ploidy or in situ hybridization to detect genetic abnormalities use only several hundred cells per sputum sample and microchip analysis of enriched epithelial cells derived from sputum-analyzed genetic aberrations screen only 2000 cells per slide. The exclusion of the majority of sputum cells from analysis may hide important disease parameters, leading to lower sensitivity than is clinically helpful. The limitations of these various technologies should not be conflated with the highly useful nature of sputum as a biological fluid, which can provide an important cellular snapshot of the lung environment.

The flow cytometric platform is well suited to analyze exfoliated cells isolated from sputum for identifying tumor-related changes in leukocyte and non-leukocyte populations that would otherwise go undetected by conventional cytological methods. FCM's ability to detect and analyze cells based on their physical characteristics (i.e., size and granularity) and cell surface molecules is powerful. Unlike microscopy or cytology, flow cytometry can analyze large numbers of cells in a short time. The variability in autofluorescence and non-specific binding properties of cell populations within and between sputum samples prohibit the use of commercially available biological controls, often used in immunophenotyping of highly characterized hematopoietic populations. For this reason, an internal FMO control has been used to establish a positivity threshold for the macrophage gates. The ability to identify alveolar macrophages as a distinct leukocyte subpopulation allowed us to include a built-in flow cytometry quality control parameter for determining the lung origin of each sputum sample. Cytology-based sample quality confirmation was needed to assure quality control according to one embodiment of the present invention.

The lungs are continuously exposed to pathogens and noxious particulates. Alveolar macrophages are the predominant, primary innate defense for maintaining a healthy lung environment. Alveolar macrophages are characterized as a distinct CD45+ population with high CD206 expression (CD206++) and a moderate-to-high signal on the granulocyte/lymphocyte axis due to their autofluorescence. Additionally, results confirmed previous observations where the light scatter profile of alveolar macrophages overlapped with that of contaminating SECs, highlighting the need of sequestering SECs from further analysis.

CD206-intermediate-positive cells (CD206+) are also macrophages though they are smaller than the alveolar CD206++ macrophages and display minimal FITC autofluorescence, indicating this macrophage population likely represents interstitial macrophages. Although interstitial macrophages (as opposed to alveolar macrophages) are normally not in contact with the airway lumen, the pro-inflammatory environment caused by chronic smoking is ideal for the permeation of interstitial macrophages into the airway. Their presence in sputum obtained from heavy smokers is therefore not unexpected. This is further substantiated by our finding that current high-risk smokers have significantly more macrophages in their sputum than former high-risk smokers.

In one embodiment of the present invention, the minimum number of sputum-derived cells in a sputum sample for automated FCM to give an adequate profile so the macrophage presence could be determined was approximately 1.5 million cells. The cutoff of five macrophages per 10,000 cells (0.05%) for determining sample adequacy was well within the detection range of the flow cytometer. Interstitial macrophages were included in the 0.05% macrophage cutoff for sample adequacy because the presence of both alveolar and interstitial macrophages are lung tissue-specific cell populations. The presence of interstitial macrophages without the presence of alveolar macrophages (a rare occurrence) is difficult to interpret biologically, therefore samples without any alveolar macrophages were deemed inadequate.

A comparative, multi-parameter analysis of sputum samples from persons with confirmed lung cancer versus those from persons at high-risk of developing the disease revealed significant differences between the two groups. Cancer samples contained significantly more CD45+ cells than high-risk samples, specifically more granulocytes/lymphocytes and interstitial macrophages.

The addition of the porphyrin TCPP to our staining protocol allowed us to identify several significant differences in the most brightly stained subset (TCPP-HIGH) between the cancer and high-risk groups. TCPP-HIGH cells from the cancer group, irrespective of their CD45 lineage, displayed lower side scatter properties than TCPP-HIGH cells from the high-risk group, suggesting a decrease in cytoplasm content, organelle degranularization, and vacuolization that has been documented with malignancy.

Analysis of the non-leukocyte (CD45−) subpopulation of TCPP-HIGH cells revealed that the cancer group contained a larger percentage of cells stained with the epithelial markers panCK and EpCAM. This difference with the high-risk group is caused mainly by the fact that former high-risk smokers have significantly fewer of these cells in their sputum compared to current smokers. The epithelial cell subpopulation from the cancer group expressed also higher levels of EpCAM, though equal levels of panCK. This was most noticeable in the Stage I/II subgroup.

Detection of epithelial-derived cancers and circulating tumor cells historically has relied on the detection of both EpCAM and cytokeratin expression. Our flow cytometry-based analysis that identifies increased expression of EpCAM in Stage I/II cancer-confirmed samples, as well as samples from high-risk participants who continue to smoke, suggests that EpCAM expression may be of specific importance in early lung cancer detection.

According to an embodiment of the Lung assay, an analysis of light scatter and fluorescence signals from the viable single cells identified by automated FCM is determined. Logistic regression models a relationship between predictor variables and a categorical (in our case binary cancer/non-cancer) response variable. Stepwise regression is a supervised machine learning process by which potentially predictive variables are added and removed and the resulting model examined for goodness of fit. Clinical factors for which complete data was available (Table 1) were included as potential predictors. Age was the clinical parameter repeatedly rated as significant during forward and reverse stepwise regression.

The performance of the Lung assay was evaluated for the 122 high risk and 28 cancer samples described in Table 1 and for a further 32 samples (Table 2) processed on a different FCM instrument (Navios EX). These 32 samples comprise a set of patients different from the ones used for the assay development using the LSRII cytometer. The same model with the same coefficients was used for both instruments but the cut off for the Navios samples was 0.5, not 0.28. The results shown in Table 3 demonstrate that Lung assay performed very well with sensitivity, specificity, and accuracy all >80% for the LSRII samples and very similar numbers for the smaller set of Navios EX samples. For both platforms a very robust negative predictive value (NPV) ≥95% was obtained.

The Lung assay also performed remarkably well with a sensitivity of 92% and specificity of 87% with an area under the ROC curve of 94% for cases where no nodules≥20 mm in diameter were detected by LDCT (Table 3, "nodules all <20 mm"). Furthermore, Lung assay performed well for all tumor types represented and at all disease stages, including I and II (Table 4, Table 5).

TABLE 2

Patient Characteristics of Navios EX Validation Samples

| Characteristic | | Non-Cancer, n = 26 | Cancer, n = 6 |
|---|---|---|---|
| Patient demographics | | | |
| Age—years | mean (Range) | 66 (52-70) | 66.5 (49-76) |
| Male | n (%) | 15 (57.8) | 6 (100) |
| Female | n (%) | 11 42.3) | 0 |
| Race | | | |
| White | n (%) | 20 (76.9) | 5 (83.3) |
| Non-white | n (%) | 2 (7.7) | 1 (16.7) |
| Not available | n (%) | 4 (15.4) | 0 |
| Ethnicity | | | |
| Hispanic | n (%) | 5 (19.2) | 0 |
| Non-Hispanic | n (%) | 17 (65.4) | 6 (100) |
| Not available | n (%) | 4 (15.4) | 0 |
| Smoking Status | | | |
| Never | n (%) | 0 | 1 (16.7) |
| Former | n (%) | 14 (53.8) | 2 (33.3) |
| Pack years | mean (SD) | 60.1 (27.3) | 90 and 25 [a] |
| Current | n (%) | 11 (42.4) | 3 (50.0) |
| Pack years | mean (SD) | 52.4 (27.7) | 75.0 (37.0) |
| Not available | n (%) | 1 (3.8) | 0 |
| Comorbidities | | | |
| COPD | n (%) | 9 (34.6) | 3 (50.0) |
| Emphysema | n (%) | 4 (15.4) | 1 (16.7) |
| Asthma | n (%) | 1 (3.8) | 0 |
| Bronchitis | n (%) | 1 (3.8) | 0 |
| Cancer | n (%) | 1 (3.8) | 2 (33.3) |
| Not available | n (%) | 2 (7.7) | 0 | n = number of samples
[a] Individual values are shown instead of mean (SD)

TABLE 4

Performance of Lung Assay by Tumor Type and Stage (LSRII)

| Tumor type (Carcinoma) | n (%) | # of cancers correctly predicted | Stage | n (%) | # of cancers correctly predicted |
|---|---|---|---|---|---|
| Non-small cell | 1 (3.6) | 1 | I | 10 (35.7) | 8 |
| Adeno | 11 (39.3) | 8 | II | 3 (10.7) | 2 |
| Squamous cell | 13 (46.4) | 11 | III | 6 (21.4) | 5 |
| Large cell | 1 (3.6) | 1 | IV | 6 (21.4) | 5 |
| Small cell | 2 (7.1) | 2 | NA | 3 (10.7) | 3 | n = number of samples
N/A = information not available

TABLE 5

Performance of Lung Assay by Tumor Type and Stage (Navios EX)

| Tumor type (Carcinoma) | n (%) | # of cancers correctly predicted | Stage | n (%) | # of cancers correctly predicted |
|---|---|---|---|---|---|
| Non-small cell | 0 | | I | 3 (50.0) | 2 |
| Adeno | 3 (50.0) | 2 | II | 0 | |
| Squamous cell | 2 (33.3) | 2 | III | 2 (33.3) | 2 |
| Large cell | 0 | 0 | IV | 0 | |
| Small cell | 0 | 0 | NA | 1 (16.7) | 1 |
| NA [a] | 1 (16.7) | 1 | | | | n = number of samples
NA = information not available
[a] Biopsy was not performed because of comorbidities. However, this patient is treated as having lung cancer.

TABLE 3

Lung Assay Performance

| | LSRII | LSRII (nodules all <20 mm) | Navios |
|---|---|---|---|
| Total samples | 150 | 132 | 32 |
| Cancer | 28 | 13 | 7 |
| Non-cancer | 122 | 119 | 25 |
| Sensitivity | 0.82 | 0.92 | 0.83 |
| Specificity | 0.88 | 0.87 | 0.77 |
| Accuracy (diagnostic effectiveness) | 0.87 | 0.88 | 0.78 |
| Area under ROC curve (95% CI) | 0.89 (0.83-0.96) | 0.94 (0.89-0.99) | 0.85 (0.71-0.98) |
| Positive predictive value (95% CI) | | | |
| Prevalence in data set | 0.61 (0.48-0.72) | 0.44 (0.33-0.57) | 0.45 (0.27-0.65) |
| Prevalence reported in high-risk [a] | 0.053 (0.033-0.085) | 0.058 (0.036-0.92) | 0.029 (0.014-0.063) |
| Prevalence in LDCT positive [b] | 0.17 (0.11-0.25) | 0.18 (0.12-0.26) | 0.10 (0.047-0.19) |
| Negative predictive value (95% CI) | | | |
| Prevalence in data set | 0.96 (0.91-0.98) | 0.99 (0.94-0.999) | 0.95 (0.77-0.99) |
| Prevalence reported in high-risk [a] | 0.998 (0.996-0.999) | 0.999 (0.995-1.000) | 0.998 (0.989-1.000) |
| Prevalence in LDCT positive [b] | 0.994 (0.987-0.997) | 0.997 (0.983-1.000) | 0.994 (0.962-0.999) |
| Positive diagnostic likelihood ratio (PDLR) [c] | 6.31 | 7.08 | 3.61 |

[a] 0.83% reported in NLST 2013.[1]
[b] 2.9% if assay used on NLST 2013 LDCT positive cases only.
[c] sensitivity/(1-specificity) see Pepe et al.[2]
Prevalence confidence intervals are calculated using R package bdpv[3] per Mercaldo et al.[4]

Each of the retained predictors contributed significantly to the model (Wald Test p-value<0.05) and removing them individually had a negative impact on the ability to correctly classify cancer and high-risk samples (Table 6). Age is a well-established clinical correlate to lung cancer,[31] as it is in our model; nevertheless, the correlation between age and the model value is not overwhelming in either LSRII or Navios EX samples (FIG. 8) with "cancer" called in some younger patients and "non-cancer" in many older ones. In fact, the exclusion of the $CD206^{low}CD3/CD19CD66b^{mid}$ signal resulted in as many misclassified samples as the exclusion of age and its interaction with $FVS510\text{-}A/\log_{10}$ FSC-A R2 (Table 6).

All reagents were titrated using sputum from persons at high-risk of developing lung cancer.

One aspect of the present invention provides for an automated flow cytometric system and method for analysis with machine learning to predict the presence of lung cancer from sputum samples. One hypothesis without being limited thereto is that sputum as the diagnostic material provides a snapshot of the tumor itself, of its microenvironment (ME) and of its field of cancerization (FoC). Expert cytological analysis of sputum can detect cancerous and pre-malignant cells but it is an extremely laborious approach which does not lend itself well to large-scale screening without automation, is prone to observer bias and does not have the ability to review large numbers of cells from the sample in

TABLE 6

Impact of model predictors on classification

| Predictor dropped from model | Cancer Called [b] Correct | Cancer Called [b] Incorrect | Non-cancer called [b] Correct | Non-cancer called [b] Incorrect | Total (Cancer and Non-cancer) [b] Incorrect |
|---|---|---|---|---|---|
| None [a] | 23 | 5 | 107 | 15 | 20 |
| age [†] | 9 | 19 | 111 | 11 | 30 |
| $TCPP/\log_{10}SSC\text{-}A$ R3 | 18 | 10 | 105 | 17 | 27 |
| $CD206^{low}CD3/CD19CD66b^{mid}$ | 20 | 8 | 100 | 22 | 30 |
| $FVS510\text{-}A/\log_{10}FSC\text{-}A$ R2 [c] | 19 | 9 | 107 | 15 | 24 |
| age: $FVS510\text{-}A/\log_{10}FSC\text{-}A$ R2 | 18 | 10 | 104 | 18 | 28 |

[a] full model as shown in FIG. 6
[b] 150 LSRII samples from Table 1
[c] including interaction term age: FVS510-A/log10FSC-A R2

TABLE 7

Reagents used for sputum staining and flow cytometric analysis according to one embodiment of the present invention

| Antibody/stain | Vendor | Final concentration | Clone |
|---|---|---|---|
| Anti-hCD45-PE | Biolegend (San Diego, CA) | 1 µg/ml | HI30 |
| Anti-hCD66b-FITC | GeneTex (Irvine, CA) | 3 µg/ml | 80H3 |
| Anti-hCD3-Alexa488 | Biolegend (San Diego, CA) | 2 µg/ml | UCHT1 |
| Anti-hCD19-Alexa488 | Biolegend (San Diego, CA) | 2 µg/ml | HIB19 |
| Anti-hCD206-PE-CF594 | BD Biosciences (San Jose, CA) | 3 µg/ml | 19.2 |
| Anti-hEpCAM-PE-CF594 | BD Biosciences (San Jose, CA) | 1 µg/ml | EBA-1 |
| Anti-hpanCK-Alexa488 | Biolegend (San Diego, CA) | 4 µg/ml | C-11 |
| FVS510 | BD Biosciences (San Jose, CA) | 6-10X | N/A |
| TCPP | Frontier Scientific (logan, UT) | 10 µg/ml | N/A |
| Paraformaldehyde | Polysciences (Warrington, PA) | 1% | N/A |
| Mouse IgG1K-Alexa488 | Biolegend (San Diego, CA) | 4 µg/ml | MOPC-21 |
| Mouse IgG1K-FITC | BD Biosciences (San Jose, CA) | 3 µg/ml | MOPC-21 |
| Mouse IgG1K-PE-CF594 | BD Biosciences (San Jose, CA) | 3 µg/ml | X-40 |
| C&ST beads*** | BD Biosciences (San Jose, CA) | N/A | N/A |
| 5 µm Microbead NIST Traceable Particle Size Standards* | Polysciences (Warrington, PA) | $4 \times 10^5$/ml | N/A |
| 20 µm Megabead NIST Traceable Particle Size Standards | Polysciences (Warrington, PA) | $2 \times 10^5$/ml | N/A |
| 30 µm Megabead NIST Traceable Particle Size Standards | Thermo Fisher Scientific (Waltham, MA) | $2 \times 10^5$/ml | N/A |
| Anti-mCompBead Plus** | BD Biosciences (San Jose, CA) | N/A | N/A | h = human;
panCK = pan-cytokeratin;
m = mouse;
all antibodies are monoclonal
*For research purposes 10 µm, 40 µm, and 50 µm Megabead NIST Particle Size Standards were also used (S2 FIG.).
**Concentrations not determined; used per manufacturer's protocol seconds as the cytology sample is limited to the size of the slide which limits the number of cells to be analyzed. Automated image processing has been used with some success to capture malignancy-associated changes in cells but is still hampered by technical complexity and the low numbers of cell analyzed.

Another aspect of the present invention provides for system and method for analyzing biological samples such as sputum for the presence of cancer cells via a high-throughput, automated flow cytometry-based approach combined with machine learning to provide the following benefits: a) the assay can be put into routine lab use without requiring expert evaluation of samples or being subject to operator bias; b) the entire sputum sample can be rapidly analyzed; and c) numerical analysis can capture complex interactions between lung cancer, ME, and FoC cells which would be difficult for individuals to detect reliably. It was unexpectedly found during Lung assay development that the predictive value of viability staining density, for example, suggests a link with apoptosis. Further, it was unexpectedly observed that specific markers of immune function are informative.

One aspect of one embodiment of the present invention provides for an automated, flow cytometry-based test that interrogates three aspects of tumorigenesis: TCPP staining, programmed cell death and the immune response. Others have shown that the performance of a sputum-based test for early lung cancer detection can significantly increase when different types of measurements are combined, for example, cytology with genetic mutations or microRNAs and methylation biomarkers. Although we used the same technology platform to measure the different cancer-related processes, these additional parameters are likely contributing to the performance improvement from the slide-based assay to the flow cytometry-based assay (FIG. 7). Moreover, the flow cytometry-based assay reads the entire sample, which was also predicted to increase test performance.

All study participants but one fulfill the criteria for lung cancer screening most recently issued by the US Preventive Services Task Force. Although our study group can be considered a sample from those eligible for lung cancer screening (one of the target populations for Lung), the sampling was small with minorities being underrepresented, as were females in the cancer groups. Moreover, the cancer prevalence in our study was just below 19% for both data sets, which is considerably higher than in a lung cancer screening population or in a patient group with lung nodules between 7 and 19 mm (the other target population for the Lung assay).

In its 2017 Official Policy Statement, the American Thoracic Society states that a molecular biomarker should affect clinical management decisions in a manner that improves clinical outcomes in order to be considered of clinical utility. The authors discuss a use case where screening is expanded to include participants currently ineligible for LDCT screening, reducing the prevalence of cancer from the NLST level of 1/120 to a hypothetical 1/500. They assume a reasonable harm threshold of 0.83%, based on NLST data, resulting in a minimum positive diagnostic likelihood ratio (PDLR) of 4.18, a level met by the larger LSRII group (Table 3). Using a hypothetical prevalence of 1/400 instead of 1/500 with the same harm threshold would yield a PDLR of 3.35 which both LSRII and Navios groups satisfy. A Lung assay system and method as disclosed herein could serve to expand early lung cancer screening to relatively underserved populations such as younger females and male African American smokers.

The Lung assay could also support clinical decision-making in LDCT-positive patients with intermediate sized nodules, possibly in conjunction with a risk calculator (e.g., Brock University's Lung Cancer Risk Calculators). Below 7 mm, only 2% of NLST patients underwent invasive follow up and above 20 mm prudence might prompt immediate follow up even though the Pan-Canadian study found that the largest nodule was not the malignant one in 20% of the participants. The intermediate size nodules, however, are notoriously challenging. If we estimate the risk threshold (R)—above which invasive follow up would be worthwhile—to be the frequency of cancer in the NLST population with nodules 7-19 mm in diameter (4.8%) and assume the cancer prevalence in the LDCT-positive population to be 3.8%, then sensitivity/(1−specificity) needs to be $\geq[(1-\text{prevalence})/\text{prevalence}] \times R/(1-R) = [(1-0.038)/0.038] \times 0.048/(1-0.48) = 1.28$,[44] a threshold met comfortably by our assay (Table 3, PDLR).

One aspect of a Lung assay according to one embodiment of the present invention is a non-invasive, sputum-based test for the detection of early-stage lung cancer. It uses a flow cytometric platform to analyze the cellular content of sputum with the analysis being fully automated and thus unbiased. Test performance in cases with small nodules (<20 mm) showed 92% sensitivity and 87% specificity.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the system and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

Methods of Classifying Flow Cytometer Data

As discussed above, aspects of the invention include methods for classifying flow cytometer data. By "flow cytometer data" it is meant information regarding the characteristics of sample particles (for example beads or cells or debris) that has been collected by any number of detectors in a particle analyzer. As discussed herein, a "particle analyzer" is an analytical tool (e.g., flow cytometer) that enables the characterization of particles on the basis of certain (e.g., optical) parameters. By "particle", it is meant a discrete component of a biological sample such as a molecule, analyte-bound bead, individual cell, or the like.

Methods of interest include classifying one or more population clusters based on determined parameters (e.g., fluorescence) of events (e.g., particles) in a sample. As used herein, a "population", or "subpopulation" of events, such as cells or other particles, generally refers to a group of events that possess properties (for example, optical, impedance, or temporal properties) with respect to one or more measured parameters such that measured parameter data form a cluster in the data-space. The data obtained from an analysis of cells (or other particles) by flow cytometry are often multidimensional, where each cell corresponds to a point in a multidimensional space defined by the parameters measured. In embodiments, data is comprised of signals from a plurality of different parameters, such as, for instance 2 or more, 3 or more, 4 or more, 5 or more, 6 or more, 7 or more, 8 or more, 9 or more, 10 or more, and including or more. Thus, populations are recognized as clusters in the data. Conversely, each data cluster generally is interpreted as corresponding to a population of a particular type of cell or particle, although clusters that correspond to noise or background typically also are observed. A cluster may be defined in a subset of the dimensions, e.g., with respect to a subset of the measured parameters (e.g., fluorochromes), which corresponds to populations that differ in only a subset of the measured parameters or features extracted from the measurements of the sample.

Aspects of the subject methods include receiving a first gate having a defined boundary. As discussed herein, a "gate" generally refers to a classifier boundary identifying a subset of data of interest (data represents features or characteristics of particles/cells in the sample). In cytometry, a gate can bound a group (i.e., population) of events of particular interest. In other words, a gate defines a boundary for classifying populations of flow cytometer data. In embodiments, a gate identifies flow cytometer data exhibiting the same or similar set of parameters. In addition, "gating" generally refers to the process of classifying the data using a defined gate for a given set of data. For example, a cell or particle is an event detected by a sensor when the cell or particle passes between the sensor and an interrogation light source of a flow cytometer and the optical feature or characteristic of the event detected by the detector/sensor is analyzable for each event.

In some embodiments, the first gate is a gate that has been drawn by a trained algorithm. In such embodiments, the trained algorithm may define the boundaries of a region (e.g., in two-dimensional space) within which flow cytometer data may be assigned a particular classification. For example, drawing a first gate may include superimposing a polygon onto a two-dimensional plot representing flow cytometer data. For example, the first gate may be received from a database of gates that have been employed in previous attempts to classify flow cytometer data.

In embodiments, methods include receiving flow cytometer data, calculating parameters of each population, and gating the population for further analysis based on the targeted population of interest. For example, an experiment may include particles/cells labeled by several fluorophores or fluorescently labeled antibodies, and groups of particles may be defined by populations corresponding to one or more fluorescent measurements. In the example, a first group may be defined by a certain range of light scattering for a first fluorophore, and a second group may be defined by a certain range of light scattering for the selected population from the first group; and a third group may be defined by a third fluorophore based upon a selected population of one or more of the first group, the second group or a combination thereof.

Flow cytometer data may be received from any suitable source. In some embodiments, flow cytometer data is received from the memory of a storage device. In such embodiments, flow cytometer data may have been previously generated and saved in the memory of the storage device for subsequent recall and analysis. In other embodiments, the flow cytometer data is received in real time. Put another way, flow cytometer data generated during the operation of a flow cytometer may subsequently (e.g., immediately) populate the data-space (e.g., two-dimensional plot) having the first gate. In some cases, the flow cytometer may be operated to generate data until a recording criterion is satisfied. The "recording criterion" discussed herein is a condition that, when met, precipitates the termination of flow cytometer operation and data collection. Any suitable recording criterion may be employed. In certain cases, the recording criterion is a time limit. Where the recording criterion is a time limit, flow cytometer data collection ceases after a prescribed amount of time (e.g., ranging from seconds to 3 hours) has elapsed. In additional cases, the recording criterion is a total number of events. In such instances, flow cytometer data collection ceases after a certain number of particles (e.g., prescribed by the user) have been analyzed. In still additional instances, the recording criterion is a number of events within a population. Flow cytometer data collection may, in such instances, cease after a certain number of particles (e.g., prescribed by the user) within a particular population (e.g., exhibiting a certain phenotype) have been analyzed.

In certain embodiments, the particles are detected and uniquely identified by exposing the particles to excitation light and measuring the fluorescence of each particle in one or more detection channels, as desired. Fluorescence emitted in detection channels used to identify the particles and binding complexes associated therewith may be measured following excitation with a single light source, or may be measured separately following excitation with distinct light sources. If separate excitation light sources are used to excite the particle labels, the labels may be selected such that all the labels are excitable by each of the excitation light sources used.

In embodiments, the flow cytometer data is received from a forward-scattered light detector. Forward-scattered light detectors of interest yield information regarding the overall size of a particle. In embodiments, the flow cytometer data is received from a side-scattered light detector. Side-scattered light detectors of interest detect refracted and reflected light from the surfaces and internal structures of the particle, which tends to increase with increasing particle complexity of structure (e.g. particle granularity). In embodiments, the flow cytometer data is received from a fluorescent light detector. Fluorescent light detectors of interest are configured to detect fluorescence emissions from fluorescent molecules, e.g., labeled specific binding members (such as labeled antibodies that specifically bind to markers of interest) associated with the particle in the flow cell. In certain embodiments, methods include detecting fluorescence from the sample with one or more fluorescence detectors, such as 2 or more, such as 3 or more, such as 4 or more, such as 5 or more, such as 6 or more, such as 7 or more, such as 8 or more, such as 9 or more, such as 10 or more, such as 15 or more and including 25 or more fluorescence detectors.

Methods in certain embodiments also include data acquisition, analysis and recording, such as with a computer, wherein multiple data channels record data from each detector for the light scatter and fluorescence emitted by each particle as it passes through the sample interrogation region of the flow cytometer. In these embodiments, analysis includes classifying and counting particles such that each particle is present as a set of digitized parameter values. The subject systems may be set to trigger on a selected parameter in order to distinguish the particles of interest from background and noise or cell populations not of interest. "Trigger" refers to a preset threshold for detection of a parameter and may be used as a means for detecting passage of a particle through the light source. Detection of an event that exceeds the threshold for the selected parameter triggers acquisition of light scatter and fluorescence data for the particle. Data is not acquired for particles or other components in the medium being assayed which cause a response below the threshold. The trigger parameter may be the detection of forward-scattered light caused by passage of a particle through the light beam. The flow cytometer then detects and collects the light scatter and fluorescence data for the particle. The data recorded for each particle is analyzed in real time or stored in a data storage and analysis means, such as a computer, as desired.

In at least one embodiment, and as readily understood by one of ordinary skill in the art, the apparatus according to the invention will include a general or specific purpose computer or distributed system programmed with computer software implementing the steps described above, which computer software may be in any appropriate computer language, including R, Python, C++, C#, Perl, Java, PUP, HTML, MySQL, distributed programming languages, etc. The apparatus may also include a plurality of such computers/distributed systems (e.g., connected over the Internet and/or one or more intranets) in a variety of hardware implementations. For example, data processing can be performed by an appropriately programmed microprocessor, computing cloud, Application Specific Integrated Circuit (ASIC), Field Programmable Gate Array (FPGA), or the like, in conjunction with appropriate memory, network, and bus elements. Alternatively a container may be employed.

Embodiments of the present invention provide a technology-based solution that overcomes existing problems with the current state of the art in a technical way to satisfy an existing problem for people who may have early-stage cancer, health care providers, insurance companies and diagnostic laboratories. An embodiment of the present invention is necessarily rooted in computer technology such as computer learning. Embodiments of the present invention achieve important benefits over the current state of the art, such as increased flexibility, faster results, non-invasive procedure, automated screening of sample, etc. For example, thousands of cells from a biological specimen can be analyzed and characterized using flow cytometry and the automated analysis of the data in the timeframe of a matter of minutes to hours with high sensitivity and specificity which speed and accuracy is not possible with analysis by a human observer to obtain the same data in the same amount of time.

The preceding examples can be repeated with similar success by substituting the generically or specifically described reactants and/or operating conditions of this invention for those used in the preceding examples.

Note that in the specification and claims, "about" or "approximately" means within twenty percent (20%) of the numerical amount cited. All computer software disclosed herein may be embodied on any computer-readable medium (including combinations of mediums), including without limitation CD-ROMs, DVD-ROMs, hard drives (local or network storage device), USB keys, other removable drives, ROM, virtual machines, software containers (for example Docker), and firmware.

Although the invention has been described in detail with particular reference to these embodiments, other embodiments can achieve the same results. Variations and modifications of the present invention will be obvious to those skilled in the art and it is intended to cover in the appended claims all such modifications and equivalents.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

What is claimed is:

1. A computer implemented flow cytometer method for automatically analyzing, with a computer, a sputum sample from a subject suspected of having lung cancer comprising:
   obtaining a plurality of cells from the sputum sample from the subject suspected of having lung cancer;
   labeling the plurality of cells with i) a plurality of cell lineage specific markers, ii) a cell viability marker and iii) a tetra (4-carboxyphenyl) porphyrin (TCPP) marker;
   analyzing with the flow cytometer the plurality of cells labeled with i-iii to obtain a subpopulation selected for cell size from the plurality of cells based upon an automatically selected bead size exclusion gate;
   from the cell size selected subpopulation, automatically selecting, by the computer, a viable singlet population of cells using an automated non-debris gate and an automated singlets gate;

from the viable singlet population of cells, automatically obtaining, by the computer, a flow cytometric data based upon i) the plurality of cell lineage specific markers, ii) the cell viability marker and iii) the TCPP marker;

automatically applying, by an appropriately programmed processor of the computer, a machine trained classifier to parameters comprising a metadata from the subject suspected of having lung cancer wherein the metadata comprises chronological age ("age") in years of the subject and the flow cytometric data obtained from the subject's sputum sample labeled with i-iii and wherein the machine trained classifier training comprises:

obtaining a flow cytometric data from multiple sputum samples labeled with markers i-iii wherein the multiple sputum samples comprise a known cancer sputum sample and a known non-cancer sputum sample;

creating an extracted matrix of per cell flow cytometric data obtained for a singlet population of cells for each of the multiple labeled sputum samples;

obtaining a metadata comprising a chronological age in years of each donor for each of the multiple sputum samples;

deriving a per cell flow cytometric signal intensity data for markers i-iii in a logicle scale and dividing by a $\log_{10}$ value of Side Scatter-Area ("SSC-$A_{log10}$") or a $\log_{10}$ value of Forward Scatter-Area ("FSC-$A_{log10}$") to produce a signal density distribution divided into three ranges a low "[R1]", a mid "[R2]" and a high "[R3]" identified for signal density as compared to a control unlabeled sputum sample;

quantizing the per cell flow cytometric data for signal intensity in the logicle scale for a pair of markers selected from markers i-iii to heuristically position a 4×4 grid on a dotplot of the per cell signal intensity as compared to an unstained sputum sample control wherein an x-axis of the dotplot represents a first of the plurality of cell lineage specific markers and a y-axis of the dotplot represents a second of the plurality of cell lineage specific markers to produce a per cell signal intensity in the logicle scale quantized into low, low-mid, mid, and high windows on the x-axis and the y-axis of the dotplot of signal intensity based on a combined labeled sputum samples;

using an Akaike information criterion, evaluate generalized language models ("GLMs") generated by iterative step-forward and step-backward parameter inclusion using the per cell flow cytometric data and the metadata from a randomly-selected training set of labelled sputum samples to produce the machine trained classifier;

validating the machine trained classifier on a test set of labeled sputum samples not included in the training set of labeled sputum samples;

setting a cut-off value for the machine trained classifier to classify the training set of labeled sputum samples and the test set of labeled sputum samples as cancer or non-cancer wherein the cut-off value corresponds to a classification having ≥80% sensitivity and ≥80% specificity; and automatically generating, by the computer, a likelihood value of ≥0 and ≤1 of having lung cancer based upon the application of the machine trained classifier to the individual sputum sample flow cytometric data and metadata from the subject suspected of having lung cancer and comparing the likelihood value to the cut-off value for the machine trained classifier to assign the classification of cancer when the likelihood value is greater than the cut-off value or non-cancer when the likelihood value is less than or equal to the cut-off value.

2. The method of claim 1 wherein the sputum sample is a single cell suspension.

3. The method of claim 1 wherein i) the plurality of cell lineage specific markers are selected from a fluorescent anti-CD206, a fluorescent anti-CD3, a fluorescent anti-CD19, a fluorescent anti-CD66b, and any combination thereof and ii) the cell viability marker is FVS510.

4. The method of claim 3 wherein the sputum sample from the subject suspected of having lung cancer includes about five CD206 expressing cells per 10,000 cells for the sputum sample to be acceptable for determination of a lung health and the machine trained classifier is $$\text{Cancer} \sim b_0 + b_1 * \text{age} + b_2 * CD206^{low}CD66b/CD3/CD19^{mid} + b_3 * \frac{FVS510}{FSC - A_{log10}}[R2] + b_4 * \frac{TCPP}{SSC - A_{log10}}[R3] - b_5 * \text{age} * \frac{FVS510}{FSC - A_{log10}}[R2]$$

wherein:

$b_0$ is an intercept value when all variables in the machine trained classifier are set to zero;

$b_1$-$b_5$ are weights for each variable determined by fitting the machine trained classifier to the training set;

$CD206^{low}CD66b/CD3/CD19^{mid}$ is a population of cells that are labeled with fluorescent anti-CD206 and identified as "low" on the signal intensity logicle scale dotplot and simultaneously labeled with fluorescent anti-CD66b/anti-CD3/anti-CD19 and identified as "mid" on the signal intensity logicle scale dotplot;

FVS510/FSC-$A_{log\ 10}$ [R2] is a proportion of cells with a FVS510 signal density greater than or equal to 0.3 but less than 0.6 ("[R2]") where the FVS510 signal density is a per cell FVS510 fluorescent signal on the logicle scale divided by the FSC-$A_{log\ 10}$; and TCPP/SSC-$A_{log\ 10}$ [R3] is a proportion of cells with a TCPP signal density greater than or equal to 0.6 ("[R3]") where the signal density is a per cell TCPP fluorescent signal on the logicle scale divided by the SSC-$A_{log\ 10}$.

5. The method of claim 1 wherein the cell viability marker labels dead cells preferentially to live cells.

6. The method of claim 1 wherein the automatically analyzing step comprises obtaining, from the plurality of cells, the flow cytometry values for a side scatter, a forward scatter, a fluorescence from TCPP, a fluorescence from the cell viability marker, and a fluorescence from the plurality of cell lineage specific markers.

7. The method of claim 1 wherein the bead size exclusion gate is set between about 5 μm and about 30 μm wherein events less than about 5 μm and greater than about 30 μm are not further analyzed.

8. The method of claim 1 wherein the automated non-debris gate excludes a majority of dead cells from a non-debris population.

9. The method of claim 1 wherein the automated singlets gate is applied to a population of cells selected in the automated non-debris gate.

10. The method of claim 1 further comprising administering a low dose computed tomography or a bronchoscopy for treatment of the subject suspected of having lung cancer when the likelihood value of having lung cancer is greater than the cutoff value of the machine trained classifier.

11. A system for automated analysis of flow cytometry data, the system comprising:
- a computer processor in communication with a memory having stored therein flow cytometry data from a plurality of markers in a plurality of cells from a sputum sample of a subject wherein the plurality of markers include i) a plurality of cell lineage specific markers, ii) a cell viability marker and iii) a tetra (4-carboxyphenyl) porphyrin (TCPP) marker;
- a computer-program product embodied in a non-transitory computer readable medium, the computer-program product comprising instructions for causing the computer processor to:
- receive the flow cytometry data acquired from the plurality of cells from the sputum sample;
- select from the plurality of cells in the sputum sample a subpopulation of cells automatically selected based upon application of automatic gates selected from a bead size exclusion gate, a viability gate and a singlets gate;
- determine, from the subpopulation, flow cytometric values of interest for the plurality of cell lineage specific markers, the cell viability marker and the TCPP marker;
- automatically apply a machine trained classifier to the flow cytometric values of interest and a metadata of the subject; wherein the machine trained classifier training comprises:
- obtaining flow cytometric data from multiple sputum samples labeled with markers i-iii wherein the multiple sputum samples comprise a known cancer sputum sample and a known non-cancer sputum sample;
- creating an extracted matrix of per cell flow cytometric data obtained for a singlet population of cells for each of the multiple labeled sputum samples;
- obtaining a metadata comprising a chronological age in years of each donor for each of the multiple labeled sputum samples;
- deriving per cell flow cytometric signal intensity data for markers i-iii in a logicle scale and dividing by a $\log_{10}$ value of Side Scatter-Area ("SSC-$A_{log\ 10}$") or $\log_{10}$ value of Forward Scatter-Area ("FSC-$A_{log\ 10}$") to produce a signal density distribution divided into three ranges a low "[R1]", a mid "[R2]" and a high "[R3]" identified for signal density as compared to a control unlabeled sputum sample;
- quantizing per cell flow cytometric data for signal intensity in the logicle scale for a pair of markers selected from markers i-iii to heuristically position a 4×4 grid on a dotplot of the per cell signal intensity as compared to an unstained sputum sample control wherein an x-axis of the dotplot represents a first of the plurality of cell lineage specific markers and a y-axis of the dotplot represents a second of the plurality of cell lineage specific markers to produce the per cell signal intensity in the logicle scale quantized into a low, a low-mid, a mid, and a high windows on the x-axis and the y-axis of the dotplot of signal intensity based on a combined labeled sputum samples;
- using an Akaike information criterion, evaluate generalized linear models ("GLMs") generated by iterative step-forward and step-backward parameter inclusion using the per cell flow cytometric data and metadata from a randomly-selected training set of labelled sputum samples to produce a selected trained classifier;
- validating the selected trained classifier on a test set of labeled sputum samples not included in the training set of labeled sputum samples;
- setting a cut-off value for the selected trained classifier to classify the training set labeled sputum sample and the test set of labeled sputum samples as cancer or non-cancer wherein the cut-off value corresponds to a classification having ≥80% sensitivity and ≥80% specificity to produce the machine trained classifier; and
- automatically generate, by the processor, to an output display device, a likelihood value of between ≥0 and ≤1 of having lung cancer based upon the application of the machine trained classifier to an individual sputum sample flow cytometric data and metadata from the subject suspected of having lung cancer and comparing the likelihood value to the cut-off value for the machine trained classifier to assign a classification of cancer when the likelihood value is greater than the cut-off value or non-cancer when the likelihood value is less than or equal to the cut-off value.

12. The system of claim 11 wherein the cell viability marker labels dead cells preferentially to live cells.

13. The system of claim 11 wherein the flow cytometric values of interest for the plurality of cells are obtained for a side scatter, a forward scatter, a fluorescence from TCPP, a fluorescence from the cell viability marker, and a fluorescence from the plurality of cell lineage specific markers.

14. The system of claim 11 wherein the bead size exclusion gate is set to exclude events having a size of less than about 5 μm and greater than about 30 μm.

15. The system of claim 11 wherein the automated viability gate excludes a majority of dead cells from a non-debris population.

16. The system of claim 11 wherein the cell viability marker is FVS510, the plurality of cell lineage specific markers are selected from a fluorescent anti-CD206, a fluorescent anti-CD3, a fluorescent anti-CD19, and a fluorescent anti-CD66b and the machine trained classifier is Likelihood of $$\text{Cancer} \sim b_0 + b_1 * \text{age} + b_2 * CD206^{low}CD66b/CD3/CD19^{mid} + b_3 * \frac{FVS510}{FSC - A_{log_{10}}}[R2] + b_4 * \frac{TCPP}{SSC - A_{log_{10}}}[R3] - b_5 * \text{age} * \frac{FVS510}{FSC - A_{log_{10}}}[R2]$$

wherein:
- $b_0$ is an intercept value when all variables in the machine trained classifier are set to zero;
- $b_1$-$b_5$ are weights for each variable determined by fitting the machine trained classifier to a training set;
- $CD206_{low}CD66b/CD3/CD19^{mid}$ is a population of cells that are labeled with the fluorescent anti-CD206 and identified as "low" on a signal intensity logicle scale dotplot and simultaneously labeled with the fluorescent anti-CD66b/anti-CD3/anti-CD19 and identified as "mid" on the signal intensity logicle scale dotplot;
- FVS510/FSC-$A_{log\ 10}$ [R2] is a proportion of cells with a FVS510 signal density greater than or equal to 0.3 but less than 0.6 ("[R2]") where the FVS510 signal density is a per cell FVS510 fluorescent signal on a logicle scale divided by the FSC-$A_{log\ 10}$; and TCPP/SSC-A$_{log\ 10}$ [R3] is a proportion of cells with a TCPP signal density greater than or equal to 0.6 ("[R3]") where the signal density is a per cell TCPP fluorescent signal on a logicle scale divided by the SSC-A$_{log\ 10}$.

17. A non-transitory computer-readable medium comprising program code that, when executed, causes processing circuitry to:
  obtain flow cytometer values from a viable singlet population of a subject's sputum sample based upon a side scatter, a forward scatter, a fluorescence from a tetra (4-carboxyphenyl) porphyrin (TCPP) marker, a fluorescence from a cell viability marker, and a fluorescence from a plurality of cell lineage specific markers;
  apply a machine trained classifier to a metadata from the subject and the flow cytometric values obtained, wherein the metadata of the subject is age of the subject in chronological years; and
  generate, based upon the application of the machine trained classifier, a classification for the sputum sample wherein the classification is selected from cancer and non-cancer, wherein the cell viability marker is FVS510, the plurality of cell lineage specific markers are selected from a fluorescent anti-CD206, a fluorescent anti-CD3, a fluorescent anti-CD19, and a fluorescent anti-CD66b and the machine trained classifier is Likelihood of $$\text{Cancer} \sim b_0 + b_1 * \text{age} +$$
$$b_2 * CD206^{low}CD66b/CD3/CD19^{mid} + b_3 * \frac{FVS510}{FSC - A_{log_{10}}}[R2] +$$
$$b_4 * \frac{TCPP}{SSC - A_{log_{10}}}[R3] - b_5 * \text{age} * \frac{FVS510}{FSC - A_{log_{10}}}[R2]$$

wherein:
  $b_0$ is an intercept value when all variables in the trained classifier are set to zero;
  $b_1$-$b_5$ are weights for each variable determined by fitting the trained classifier to a training set;
  CD206$^{low}$CD66b/CD3/CD19$^{mid}$ is a population of cells that are labeled with the fluorescent anti-CD206 and identified as "low" on a signal intensity logicle scale dotplot and simultaneously labeled with the fluorescent anti-CD66b/anti-CD3/anti-CD19 and identified as "mid" on the signal intensity logicle scale dotplot wherein the CD206$^{low}$CD66b/CD3/CD19$^{mid}$ population of cells are determined from the signal intensity logicle scale dotplot partitioned with a 4×4 grid heuristically positioned on the dotplot of the per cell signal intensity as compared to an unstained sputum sample control wherein an x-axis of the dotplot represents a first of the plurality of cell lineage specific markers and a y-axis of the dotplot represents a second of the plurality of cell lineage specific markers to produce the per cell signal intensity in the logicle scale quantized into a low, a low-mid, a mid, and a high windows on the x-axis and the y-axis of the dotplot of signal intensity based on a combined labeled sputum samples;
  FVS510/FSC-A$_{log\ 10}$ [R2] is a proportion of cells with a FVS510 signal density greater than or equal to 0.3 but less than 0.6 ("[R2]") where the FVS510 signal density is a per cell FVS510 fluorescent signal on a logicle scale divided by a $\log_{10}$ value of Forward Scatter-Area ("FSC-A$_{log\ 10}$") wherein R2 is identified from a signal density distribution divided into three ranges a low "[R1]", a mid "[R2]" and a high "[R3]" identified for a signal density as compared to a control unlabeled sputum sample; and
  TCPP/SSC-A$_{log\ 10}$ [R3] is a proportion of cells with a TCPP signal density greater than or equal to 0.6 ("[R3]") where the TCPP signal density is a per cell TCPP fluorescent signal on a logicle scale divided by a $\log_{10}$ value Side Scatter-Area ("SSC-A$_{log\ 10}$") to produce a signal density distribution divided into three ranges a low "[R1]", a mid "[R2]" and a high "[R3]" identified for signal density as compared to the control unlabeled sputum sample.

18. The non-transitory computer-readable medium of claim 17 wherein the cell viability marker labels dead cells preferentially to live cells.

19. The non-transitory computer-readable medium of claim 17 wherein a minimum number of about five CD206 positive cells per 10,000 cells are present in the sputum sample to be analyzed for the sputum sample to be acceptable for determination of a lung health.

20. The non-transitory computer-readable medium of claim 17 wherein a bead size exclusion gate is set between 5 µm and 30 µm.

21. The non-transitory computer-readable medium of claim 17 wherein an automated non-debris gate excludes a majority of dead cells from a non-debris population.

* * * * *